(12) United States Patent
Kobayashi et al.

(10) Patent No.: US 6,392,376 B1
(45) Date of Patent: May 21, 2002

(54) ELECTRIC VEHICLE MOTOR CONTROLLER WITH TEMPERATURE VARIATION COMPENSATION

(75) Inventors: Masaru Kobayashi, Tokyo; Kiyoharu Anzai, Hyogo; Hirotoshi Maekawa, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/657,639

(22) Filed: Sep. 7, 2000

(30) Foreign Application Priority Data

Mar. 17, 2000 (JP) ........................................ 2000-075608

(51) Int. Cl.$^7$ ................................................ H02H 7/08
(52) U.S. Cl. ........................ 318/471; 318/472; 318/473; 318/432
(58) Field of Search ................................ 318/471, 472, 318/473, 629, 432

(56) References Cited

U.S. PATENT DOCUMENTS

| | | | | |
|---|---|---|---|---|
| 5,481,168 A | * | 1/1996 | Mutoh et al. | 318/432 |
| 5,617,281 A | * | 4/1997 | Bauer et al. | 361/27 |
| 5,644,463 A | * | 7/1997 | El-Sharkawi et al. | 361/94 |
| 5,743,351 A | * | 4/1998 | McLaughlin | 180/446 |
| 6,100,660 A | * | 8/2000 | Ikeyama et al. | 318/473 |
| 6,107,767 A | * | 8/2000 | Lu et al. | 318/561 |

* cited by examiner

Primary Examiner—Robert E. Nappi
Assistant Examiner—Rita Leykin
(74) Attorney, Agent, or Firm—Sughrue Mion, PLLC

(57) ABSTRACT

A motor controller improves reliability and enables stable and high-accuracy control by detecting a current value running through the motor detected by current detectors by preventing changes in ambient environment, particularly the influence of temperature variations. The arithmetic and control unit of the motor controller has a storage unit for storing current detection characteristic compensation data for compensating for fluctuations in the characteristics of the current detectors, a current value computing device for computing current values by correcting detection currents from the current detectors, and a device for computing and generating drive signals for controlling the switching of the power elements based on the computed current values.

14 Claims, 17 Drawing Sheets

FIG. 6

PATTERN 0

|       | U   | V   | W   |
|-------|-----|-----|-----|
| UPPER | Off | Off | Off |
| LOWER | On  | On  | On  |

PATTERN 1

|       | U   | V   | W   |
|-------|-----|-----|-----|
| UPPER | On  | Off | Off |
| LOWER | Off | On  | On  |

PATTERN 2

|       | U   | V   | W   |
|-------|-----|-----|-----|
| UPPER | On  | On  | Off |
| LOWER | Off | Off | On  |

PATTERN 3

|       | U   | V   | W   |
|-------|-----|-----|-----|
| UPPER | Off | On  | Off |
| LOWER | On  | Off | On  |

PATTERN 4

|       | U   | V   | W   |
|-------|-----|-----|-----|
| UPPER | Off | On  | On  |
| LOWER | On  | Off | Off |

PATTERN 5

|       | U   | V   | W   |
|-------|-----|-----|-----|
| UPPER | Off | Off | On  |
| LOWER | On  | On  | Off |

PATTERN 6

|       | U   | V   | W   |
|-------|-----|-----|-----|
| UPPER | On  | Off | On  |
| LOWER | Off | On  | Off |

PATTERN 7

|       | U   | V   | W   |
|-------|-----|-----|-----|
| UPPER | On  | On  | On  |
| LOWER | Off | Off | Off |

FIG. 7

POWER ELEMENT TEMPERATURE DETECTION
CHARACTERISTIC MAP

|  | U-PHASE DETECTION VALUE | V-PHASE DETECTION VALUE | W-PHASE DETECTION VALUE |
|---|---|---|---|
| TEMPERATURE t0 | $\alpha_{u0}$ | $\alpha_{v0}$ | $\alpha_{w0}$ |
| TEMPERATURE t1 | $\alpha_{u1}$ | $\alpha_{v1}$ | $\alpha_{w1}$ |
| ⋮ | ⋮ | ⋮ | ⋮ |
| TEMPERATURE tn | $\alpha_{un}$ | $\alpha_{vn}$ | $\alpha_{wn}$ |

FIG. 11

U-W PHASE CURRENT APPLICATION

PHASE CHANGE SIGNAL
U SIDE

PATTERN A1

|       | U   | V   | W   |
|-------|-----|-----|-----|
| UPPER | On  | Off | Off |
| LOWER | Off | Off | On  |

PATTERN A2

|       | U   | V   | W   |
|-------|-----|-----|-----|
| UPPER | Off | Off | On  |
| LOWER | On  | Off | Off |

V-W PHASE CURRENT APPLICATION

PHASE CHANGE SIGNAL
V SIDE

PATTERN B1

|       | U   | V   | W   |
|-------|-----|-----|-----|
| UPPER | Off | On  | Off |
| LOWER | Off | Off | On  |

PATTERN B2

|       | U   | V   | W   |
|-------|-----|-----|-----|
| UPPER | Off | Off | On  |
| LOWER | Off | On  | Off |

FIG. 12

CURRENT DETECTION CHARACTERISTIC MAPS   U-PHASE MAP / V-PHASE MAP / W-PHASE MAP

| STORAGE BLOCK u0 | ELEMENT TEMPERATURE tu00 | ELEMENT TEMPERATURE tu01 | | ELEMENT TEMPERATURE tu0r |
|---|---|---|---|---|
| i0 | $\beta u00$ | $\beta u01$ | | $\beta u0r$ |

| STORAGE BLOCK u1 | ELEMENT TEMPERATURE tu10 | ELEMENT TEMPERATURE tu11 | | ELEMENT TEMPERATURE tu1r |
|---|---|---|---|---|
| i1 | $\beta u10$ | $\beta u11$ | | $\beta u1r$ |

| STORAGE BLOCK un | ELEMENT TEMPERATURE tun0 | ELEMENT TEMPERATURE tun1 | | ELEMENT TEMPERATURE tunr |
|---|---|---|---|---|
| in | $\beta un0$ | $\beta un1$ | | $\beta unr$ | t*0 : STANDARD VALUE OF POWER ELEMENT TEMPERATURE AS 0-th MAP ELEMENT
tr : UPPER LIMIT VALUE OF POWER ELEMENT USE TEMPERATURE RANGE

FIG.16

CURRENT DETECTION CHARACTERISTIC
COMPENSATION EXPRESSION OPERATION
COEFFICIENT MAP

| | TEMPERATURE COEFFICIENT | RESISTANCE VALUE |
|---|---|---|
| TEMPERATURE t0 | $\alpha t0$ | $Rt0$ |
| TEMPERATURE t1 | $\alpha t1$ | $Rt1$ |
| ⋮ | ⋮ | ⋮ |
| TEMPERATURE tn | $\alpha tn$ | $Rtn$ |

US 6,392,376 B1

ELECTRIC VEHICLE MOTOR CONTROLLER WITH TEMPERATURE VARIATION COMPENSATION

BACKGROUND OF THE INVENTION

1. Field of the Invention

The present invention relates to a motor controller for driving a motor using an electric converter which incorporates power elements.

2. Description of the Prior Art

A prior art motor controller which controls a current to be applied to a motor by controlling the switching of power elements will be described hereinunder.

FIG. 17 is a block diagram showing the constitution of a prior art motor controller. This is an example of car motor controller to be mounted on a vehicle and a three-phase AC motor is used as a motor.

In FIG. 17, reference numeral 1 denotes a motor controller, 2 a motor, 3 an arithmetic and control unit, and 4 a power conversion semiconductor as a power converter. The power conversion semiconductor 4 has three phase switching arms (U-phase arm, V-phase arm, W-phase arm). The U-phase arm, one of the switching arms, comprises an upper arm switching element 5a, lower arm switching element 5b, upper arm free wheeling diode 6a and lower arm free wheeling diode 6b. The V-phase arm and the W-phase arm have a similar structure and comprise upper arm switching elements 5c, 5e, lower arm switching elements 5d, 5f, upper arm free wheeling diodes 6c, 6e and lower arm free wheeling diodes 6d, 6f, respectively. One switching element 5 (5a to 5f) and one free wheeling diode 6 (6a to 6f) constitute one power element 7 (7a to 7f). Denoted by 8 (8a to 8c) are U-phase, V-phase and W-phase current detectors arranged on power lines for the motor 2 external to the power conversion semiconductor 4.

As shown in the figure, two power elements 7 are connected in series for each phase of three-phase AC. One power element connected to the high potential side of DC power input is called "upper arm" and the other power element connected to the low potential side of DC power input is called "lower arm".

A description is subsequently given of the operation of this motor controller.

The motor controller 1 converts DC power from an unshown power source into AC power and supplies the AC power to the motor 2. The conversion of DC power into AC power is carried out by switching the switching elements 5 constituting the power elements 7 of the power conversion semiconductor 4. The arithmetic and control unit 3 computes a current instruction value to be applied to the motor 2 to cause the motor 2 to carry out desired operation and generates gate drive signals for turning on or off the switching elements 5 so that a current corresponding to the current instruction value runs through the motor 2. The gate drive signals are transmitted to the gates G of the switching elements 5 of the three phases.

The control of the motor 2 by a vector control method which is frequently used to control the generation torque of the motor 2 accurately will be described hereinunder.

In this method, the amounts of voltage and current of three-phase AC are decomposed into vectors which are plotted on the axis (d axis) of coordinates rotating in the same direction as a magnetic flux and the axis (q axis) of coordinates rotating in a direction perpendicular to the above direction to control generation torque by controlling voltage and current on the rectangular coordinates.

The relationship between voltage and current on the rotary rectangular coordinates (d and q coordinates) is represented by the following expression when a permanent magnet type synchronous machine is used as the motor 2:

$$\begin{bmatrix} V_d \\ V_q \end{bmatrix} = \begin{bmatrix} R_a & -\omega \cdot L \\ \omega \cdot L & R_a \end{bmatrix} \cdot \begin{bmatrix} i_d \\ i_q \end{bmatrix} + \begin{bmatrix} 0 \\ \omega \cdot \phi_a \end{bmatrix} \quad (1)$$

wherein Vd is the voltage of the d axis, Vq is the voltage of the q axis, id is the current of the d axis, iq is the current of the q axis, Ra is a primary resistance, L is an inductance, $\phi$a is the magnetic flux of the magnet and $\omega$ is a rotation angle speed.

The generation torque τm of the motor 2 at this point is represented by the following expression:

$$\tau_m = P_m \cdot \phi_a \cdot i_q \quad (2)$$

wherein Pm is the polar logarithm of the motor 2.

The polar logarithm Pm and the magnetic flux $\phi$a are fixed by the motor 2, and the adjustment of the generation torque τm is carried out by controlling the amount of the current iq of the q axis. Therefore, the accurate control of the motor 2 means the accurate control of the generation torque of the motor 2, that is, the amount of the current iq of the q axis. Therefore, three-phase AC running through the motor 2 is detected by the current detectors 8 and decomposed into vectors on the d axis and q axis to compute the current id of the d axis and the current iq of the q axis. Further, voltage Vd on the d axis and voltage Vq on the q axis are computed from id and iq to obtain desired generation torque τm based on which gate drive signals are generated.

Since the control accuracy of generation torque is connected with the acceleration and deceleration of a vehicle when the car motor controller 1 is used for an electric car using the motor 2 as a drive source, it is an important factor which affects riding comfort. When the car motor controller 1 is used for a hybrid car which uses the motor 2 and an internal combustion engine as drive sources, control accuracy becomes more important because both the generation torque of the motor 2 and the generation torque of the internal combustion engine are controlled in a well balanced manner to reduce fuel consumption and harmful substances contained in exhaust gas. Thus, high control accuracy is required of the car motor controller 1. As described above, since a current running through the motor 2 is detected by the current detectors 8 to control the generation torque of the motor 2 directly, high-accuracy control is possible.

However, since the current detectors 8 are arranged external to the power conversion semiconductor 4 to detect the three-phase current of the motor 2 in the prior art motor controller 1, fixing members constituting the current detectors 8 are required and also signal lines for connecting the current detectors 8 to the arithmetic and control unit 3 are required, thereby increasing the number of assembly steps. Further, when these signal lines are affected by noise and exert a bad influence upon detection current values, or disconnected due to the deterioration of a harness after long-time use or the loose contacts of connectors, they cause a sudden change in generation torque during operation. This may impair the continuity of control of the car motor controller 1 and exert a bad influence upon the behavior of a vehicle.

To overcome the above problems, a motor controller described below has recently been developed.

In the motor controller disclosed by Japanese Laid-open Patent Application No. 11-149928 which was filed by the present applicant, current detectors which have resistance characteristics are used, arranged on the same substrate as power elements and built in a power conversion semiconductor, and the power conversion semiconductor and an arithmetic and control unit are stored in the same container.

This eliminates an increase in the number of assembly steps caused by the external arrangement of the current detectors, reduces the number of constituent elements and the number of trouble possible sites, and shortens the signal lines between the current detectors and the arithmetic and control unit, thereby reducing the influence of noise.

SUMMARY OF THE INVENTION

In the motor controller which comprises current detectors having resistance characteristics, arranged on the same substrate as power elements and stored in a power conversion semiconductor, the current detectors have such a problem that the reliability of current values detected by the current detectors is low because the current detectors are readily affected by changes in ambient environment, particularly temperature variations. This tendency is marked when the current detectors are arranged external to a vehicle because changes in ambient environmental temperature are large. This leads to the deterioration of control accuracy and a reduction in the durability of the current detectors themselves.

It is an object of the present invention which has been made to solve the above problems to provide a motor controller which improves the reliability of motor control and enables stable and high-accuracy control by detecting current values running through the motor by means of current detectors by preventing changes in ambient environment, particularly the influence of temperature variations.

According to a first aspect of the present invention, there is provided a motor controller for controlling an application current to a motor, which comprises a power converter incorporating power elements, current detectors arranged on power lines for connecting the power elements to the motor, and an arithmetic and control unit for controlling the switching of the power elements using detection currents from the current detectors, wherein the arithmetic and control unit comprises a storage unit for storing current detection characteristic compensation data for compensating for fluctuations in the characteristics of the current detectors, current value computing means for computing current values by correcting detection currents from the current detectors based on the current detection characteristic compensation data, and means for computing and generating drive signals for controlling the switching of the power elements based on the computed current values.

According to a second aspect of the present invention, there is provided a motor controller for controlling an application current to a motor, which comprises current detectors arranged on power lines for connecting power elements in a power converter to the motor and an arithmetic and control unit for controlling the switching of the power elements using detection currents from the current detectors, wherein the controller further comprises an ambient temperature detector for detecting the ambient temperature of the arithmetic and control unit and current value computing means for computing current values by correcting detection currents from the current detectors so that the arithmetic and control unit compensates for changes in the constants of electronic circuit parts in the arithmetic and control unit caused by temperature variations based on the detected ambient temperature.

According to a third aspect of the present invention, there is provided a motor controller, wherein an ambient temperature detector for detecting the ambient temperature of the arithmetic and control unit is provided, and current value computing means for computing current values by correcting detection currents from the current detectors based on current detection characteristic compensation data carries out a compensation operation for compensating for changes in the constants of the electronic circuit parts in the arithmetic and control unit caused by temperature variations based on the detected ambient temperature to compute the current values.

According to a fourth aspect of the present invention, there is provided a motor controller, wherein the current detectors are built in the power converter, and the power converter and the arithmetic and control unit are stored in the same container.

According to a fifth aspect of the present invention, there is provided a motor controller, wherein the power converter and the arithmetic and control unit are stored in the same container, current detectors having resistance characteristics are used and stored in the power converter, temperature detectors are provided near the current detectors, a storage unit prestores current detection characteristic compensation data for compensating for fluctuations in the characteristics of the current detectors caused by the temperature variations, and current value computing means computes current values by correcting detection currents from the current detectors based on detection temperatures from the temperature detectors and the current detection characteristic compensation data.

According to a sixth aspect of the present invention, there is provided a motor controller, wherein the current detectors are arranged near the power elements, and the temperature detectors also serve as power element temperature detectors for preventing the overheating of the power elements.

According to a seventh aspect of the present invention, there is provided a motor controller, wherein the characteristics of the temperature detectors of the third aspect are prestored as data connected with the detection temperature of the ambient temperature detector, and the arithmetic and control unit comprises temperature computing means for computing temperature from the detection values of the temperature detectors based on data on the characteristics of the temperature detectors.

According to an eighth aspect of the present invention, there is provided a motor controller, wherein the arithmetic and control unit comprises means for creating current detection characteristic compensation data before the control operation of the motor, and the characteristics of the current detectors are measured to create the above current detection characteristic compensation data for compensating for fluctuations in the characteristics and to store them in the storage unit.

According to a ninth aspect of the present invention, there is provided a motor controller, wherein the characteristics of the current detectors are measured to create the current detection characteristic compensation data, accompanied by the switching operation of the power elements.

According to a tenth aspect of the present invention, there is provided a motor controller, wherein the arithmetic control unit comprises means for creating the current detection characteristic compensation data before the control operation of the motor, and the characteristics of the current detectors are measured by controlling the switching operation of the power elements based on detection temperatures from the current detectors to create the above current detection characteristic compensation data for compensating for fluctuations in the characteristics of the current detectors caused by temperature variations and to store them in the storage unit.

According to an eleventh aspect of the present invention, there is provided a motor controller, wherein the switching operation of the power elements at the time of creating the current detection characteristic compensation data is carried out so that a direct current runs through the current detectors.

According to a twelfth aspect of the present invention, there is provided a motor controller, wherein the current detection characteristic compensation data are stored separately for each of the current detectors and the computation of current values by the current value computing means is carried out for each of the current detectors.

According to a thirteenth aspect of the present invention, there is provided a motor controller, wherein the current detection characteristic compensation data are provided in the form of temperature compensation maps or temperature compensation expressions.

According to a fourteenth aspect of the present invention, there is provided a motor controller, wherein detection value data from the current detectors are collected together with temperature values detected by the temperature detectors of the fifth aspect such that the intervals between the temperature data values become a predetermined value with respect to an instruction current value running through the current detectors, and compensation maps are constructed with instruction current values, temperature data and detection value data collected by changing the instruction current value at predetermined intervals.

The above and other objects, features and advantages of the invention will become more apparent from the following description when taken in conjunction with the accompanying drawings.

BRIEF DESCRIPTION OF THE ACCOMPANYING DRAWINGS

FIG. 6 is a diagram showing the switching patterns of switching elements at the time of creating temperature detection characteristic data by the motor controller according to Embodiment 3 of the present invention;

FIG. 7 is a diagram showing a power element temperature detection characteristic map according to Embodiment 3 of the present invention;

FIG. 11 is a diagram showing the switching patterns of switching elements at the time of creating current detection characteristic data by the motor controller according to Embodiment 4 of the present invention;

FIG. 12 is a diagram showing a current detection characteristic map according to Embodiment 4 of the present invention;

FIG. 16 is a diagram of a compensation expression operation coefficient map for current detection characteristics according to Embodiment 5 of the present invention.

DETAILED DESCRIPTION OF THE PREFERRED EMBODIMENTS

Embodiment 1

Embodiment 1 of the present invention will be described hereinunder with reference to the accompanying drawings.

Figure 1:
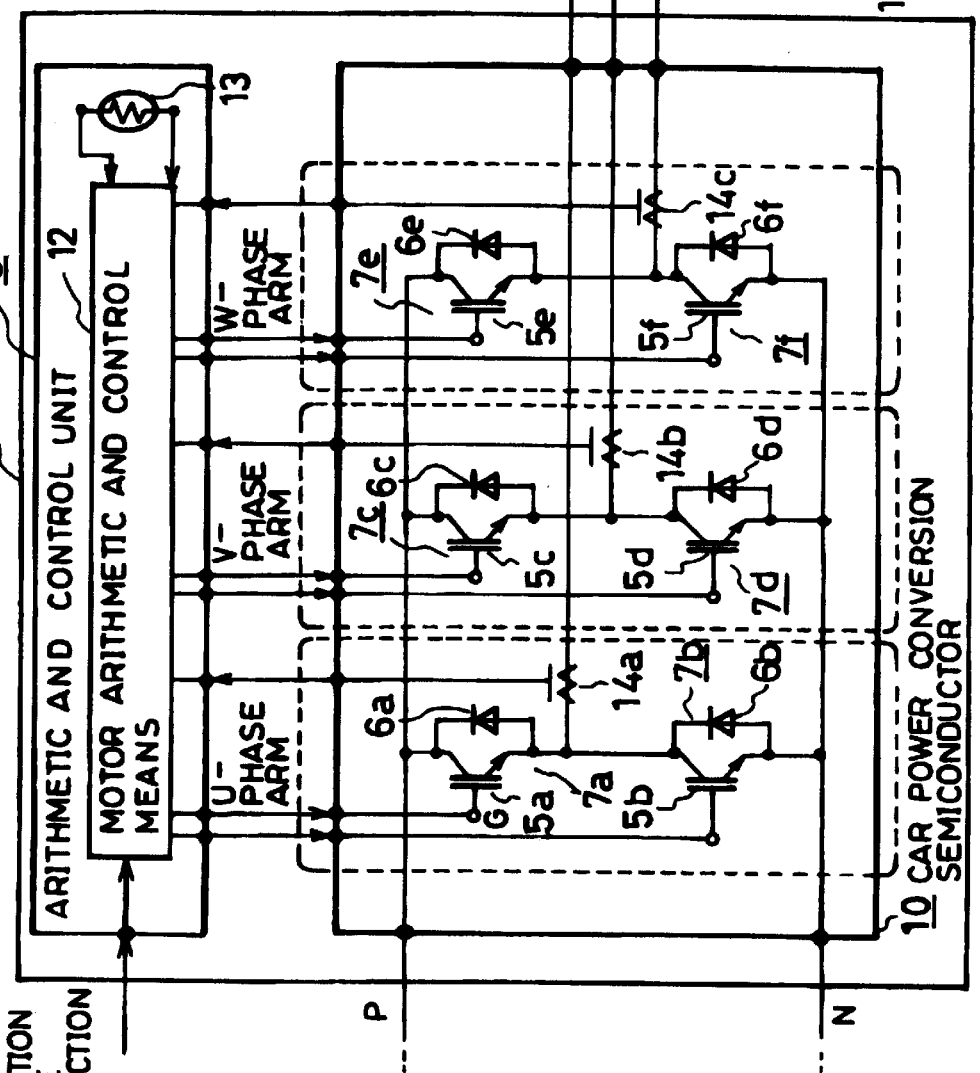
FIG. 1 is a block diagram showing the constitution of a motor controller according to Embodiment 1 of the present invention.

FIG. 1 is a block diagram showing the constitution of a motor controller according to Embodiment 1 of the present invention. This is a car motor controller to be mounted on a vehicle and a three-phase AC motor is used as a motor. The same or corresponding elements as in the prior art are given the same reference symbols.

In FIG. 1, reference numeral 2 denotes a motor, 9 an arithmetic and control unit, 10 a power conversion semiconductor as a power converter, and 11 a motor controller which incorporates the arithmetic and control unit 9 and the power conversion semiconductor 10 in the same container. The arithmetic and control unit 9 comprises arithmetic and control means 12 and an ambient temperature detector 13 for detecting the ambient temperature of the unit 9.

The power conversion semiconductor 10 comprises three phase switching arms (U-phase arm, V-phase arm, W-phase arm). The U-phase arm which is one of the switching arms comprises an upper arm switching element 5a, lower arm switching element 5b, upper arm free wheeling diode 6a and lower arm free wheeling diode 6b. Like the U-phase arm, the V-phase arm and the W-phase arm comprise upper arm switching elements 5c, 5e, lower arm switching elements 5d, 5f, upper arm free wheeling diodes 6c, 6e and lower arm free wheeling diodes 6d, 6f, respectively. One switching element 5 (5a to 5f) and one free wheeling diode 6 (6a to 6f)

constitute one power element 7 (7a to 7f). Denoted by 14 (14a to 14c) are U-phase, V-phase and W-phase current detectors arranged on power lines for connecting the power elements 7 to the motor 2 and incorporated in the power conversion semiconductor 10.

Two power elements 7 are connected in series for each phase of three-phase AC. One power element connected to the high potential side of DC power input is called "upper arm" and the other power element connected to the low potential side of DC power input is called "lower arm".

A description is subsequently given of the operation of the motor controller 11.

The motor controller 11 converts DC power from an unshown power source into AC power and supplies the AC power to the motor 2. The conversion of DC power into AC power is carried out by switching the switching elements 5 constituting the power elements 7 of the power conversion semiconductor 10. The arithmetic and control unit 3 computes a current instruction value to be applied to the motor 2 to cause the motor 2 to carry out desired operation and generates gate drive signals for turning on or off the switching elements 5 so that a current corresponding to the current instruction value runs through the motor 2. The gate drive signals are transmitted to the gates G of the switching elements 5 of the three phases.

The control of a permanent magnet type synchronous machine as the motor 2 by a vector control method will be described hereinunder. A generation torque instruction value τm* required of the motor 2 is first input into the motor controller 11 from an unshown external device. Since the generation torque τm of the motor 2 is proportional to the magnetic flux øa of the magnet and the current iq of the q axis as described above (see the expression (2)), the arithmetic and control means 12 computes a q axis current instruction value iq* based on the generation torque instruction valuer τm*.

When the U-phase current detection signal, V-phase current detection signal and W-phase current detection signal of the motor 2 output from the U-phase current detector 14a, V-phase current detector 14b and W-phase current detector 14c are input into the arithmetic and control means 12, a U-phase current iu, V-phase current iv and W-phase current iw are computed from these detection signals and then decomposed into vectors on the axis (d axis) of coordinates rotating in the same direction as that of a magnetic flux and the axis (q axis) of coordinates rotating in a direction perpendicular to the above direction by a known computing method to compute the actual current value id of the d axis and the actual current value iq of the q axis.

To control the generation torque of the motor 2 so that it becomes equal to the instruction value τm*, the voltage instruction value Vq* of the q axis is computed by making a proportional integration (PI) operation on a difference Δiq (=iq*−iq) so that the actual current value iq becomes equal to the instruction value iq*. The current instruction value id* of the d axis is zero because it does not need to run. Like the current of the q axis, the voltage instruction value Vd* of the d axis is computed by making a proportional integration (PI) operation on a difference Δid (=id*−id) so that the actual current value id becomes equal to the instruction value id*.

When the motor 2 is in a steady state at this point, the voltage instruction value Vq* of the q axis and the voltage instruction value Vd* of the d axis become equal to the voltage Vq of the q axis and the voltage Vd of the d axis shown in the above voltage-current equation (expression (1)), respectively.

Subsequently, a U-phase voltage instruction value Vu*, V-phase voltage instruction value Vv* and W-phase voltage instruction value Vw* which are three phase AC voltage instruction values to be applied to the motor 2 are computed from the voltage instruction values Vq* and Vd* by an inverse operation to that for decomposition into vectors at the time of the computation of the actual current values. Further, to apply the three phase AC voltage instruction values, gate drive signals for the six switching elements 5 of the upper and lower arms of U, V and W phases are generated by a known chopping wave comparison sinusoidal wave approximation PWM formation method and transmitted to the gates G of the switching elements 5a to 5f in the power conversion semiconductor 10 from the arithmetic and control unit 9.

The concrete constitution of the arithmetic and control unit 9 which carries out such control processing will be described with reference to FIG. 2.

Figure 2:
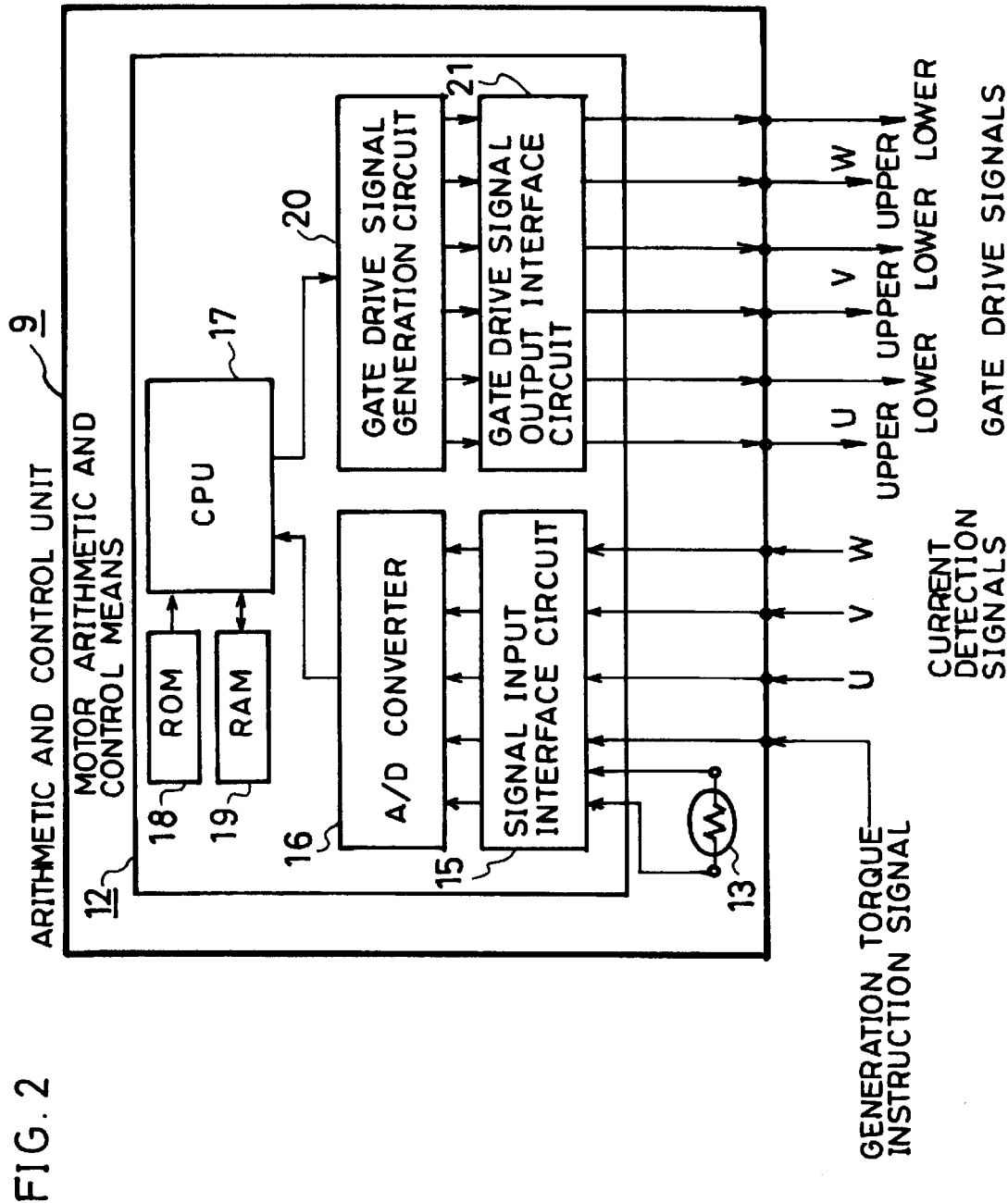
FIG. 2 is a diagram showing the constitution of an arithmetic and control unit according to Embodiment 1 of the present invention.

In FIG. 2, reference numeral 15 denotes a signal input interface circuit, 16 A/D converter, 17 CPU, 18 ROM, 19 RAM, 20 gate drive signal generation circuit, and 21 gate drive signal output interface circuit. These elements 15 to 21 form arithmetic and control means 12.

A detailed description will be given of the operation of the arithmetic and control unit 9.

The amount of a three-phase current running through the motor 2 is detected by the current detectors 14 and current detection signals are transmitted to the signal input interface circuit 15 in the arithmetic and control means 12. The signal input interface circuit 15 shapes the waveforms of the current detection signals and converts the levels of the signals and the A/D converter 16 converts the signals into discrete numerical values which are then applied to the CPU 17.

A generation torque instruction signal output to the motor 2 from an unshown external device is converted into a discrete numeral value by the signal input interface circuit 15 and the A/D converter 16 and input into the CPU 17 as a generation toque instruction value τm. Similarly, a signal from the ambient temperature detector 13 is input into the CPU 17 through the signal input interface circuit 15 and the A/D converter 16 as the ambient temperature of the arithmetic and control unit 3.

Current value data detected by the current detectors 14, transmitted to the arithmetic and control means 12 and input into the CPU 17 as current values include errors. The factors of producing these errors include fluctuations in the characteristics of the current detectors 14, the influence of noise in the transmission paths of detection signals from the current detectors 14 to the arithmetic and control means 12 and an error in the conversion of current values after they are transmitted to the arithmetic and control means 12.

The influence of noise which is the second factor has no problem because the motor controller 11 is constituted such that the current detectors 14 are incorporated in the power conversion semiconductor 10 and that the arithmetic and control unit 9 and the power conversion semiconductor 10 are stored in the same container, thereby shortening signal paths between the current detectors 14 and the arithmetic and control means 12 and suppressing the superimposition of noise.

The third factor is changes in the constants of electronic circuit parts constituting the signal input interface circuit 15 in the arithmetic and control means 12 caused by temperature variations.

Thus, the current value data input into the CPU 17 from the current detectors 14 include errors caused by fluctuations in the characteristics of the current detectors 14 and changes in the constants of electronic circuit parts in the arithmetic and control means 12 caused by temperature variations. Current detection characteristic compensation data for compensating for these errors are prestored in the ROM 18 of the arithmetic and control means 12, and the CPU 17 computes current values by correcting the input current value data using the current detection characteristic compensation data in the ROM 18 based on an ambient temperature from the ambient temperature detector 13.

The CPU 17 carries out a vector decomposition operation on three phase current values using the RAM 19 as an operation area in accordance with a program stored in the ROM 18 to compute the actual current value id of the d axis and the actual current value iq of the q axis. The current instruction value iq* of the q axis is computed based on the input generation torque instruction value τm*. The current instruction value id* of the d axis is set to a predetermined value (zero in this case).

Subsequently, the CPU 17 carries out a proportional integration (PI) operation so that the actual current values of the d axis and the q axis become equal to the respective instruction values to compute voltage instruction values Vd* and Vq* and carries out the reverse conversion of vectors on the axes of the three phase AC coordinates to compute three phase AC voltage instruction values Vu*, Vv* and Vw*.

Thereafter, the computed three phase AC voltage instruction values are input into the gate drive signal generation circuit 20 to generate gate drive signals for switching the switching elements 5. These signals are transmitted to the gate drive signal output interface circuit 21 which shapes the waveforms of the signals and converts the levels of the signals and then to the gates G of the switching elements 5a to 5f in the power conversion semiconductor 10.

FIG. 2 shows the constitution of the arithmetic and control unit 9 according to circuits and the like used. The function of the arithmetic and control means 12 will be described hereinunder with reference to FIG. 3.

Figure 3:
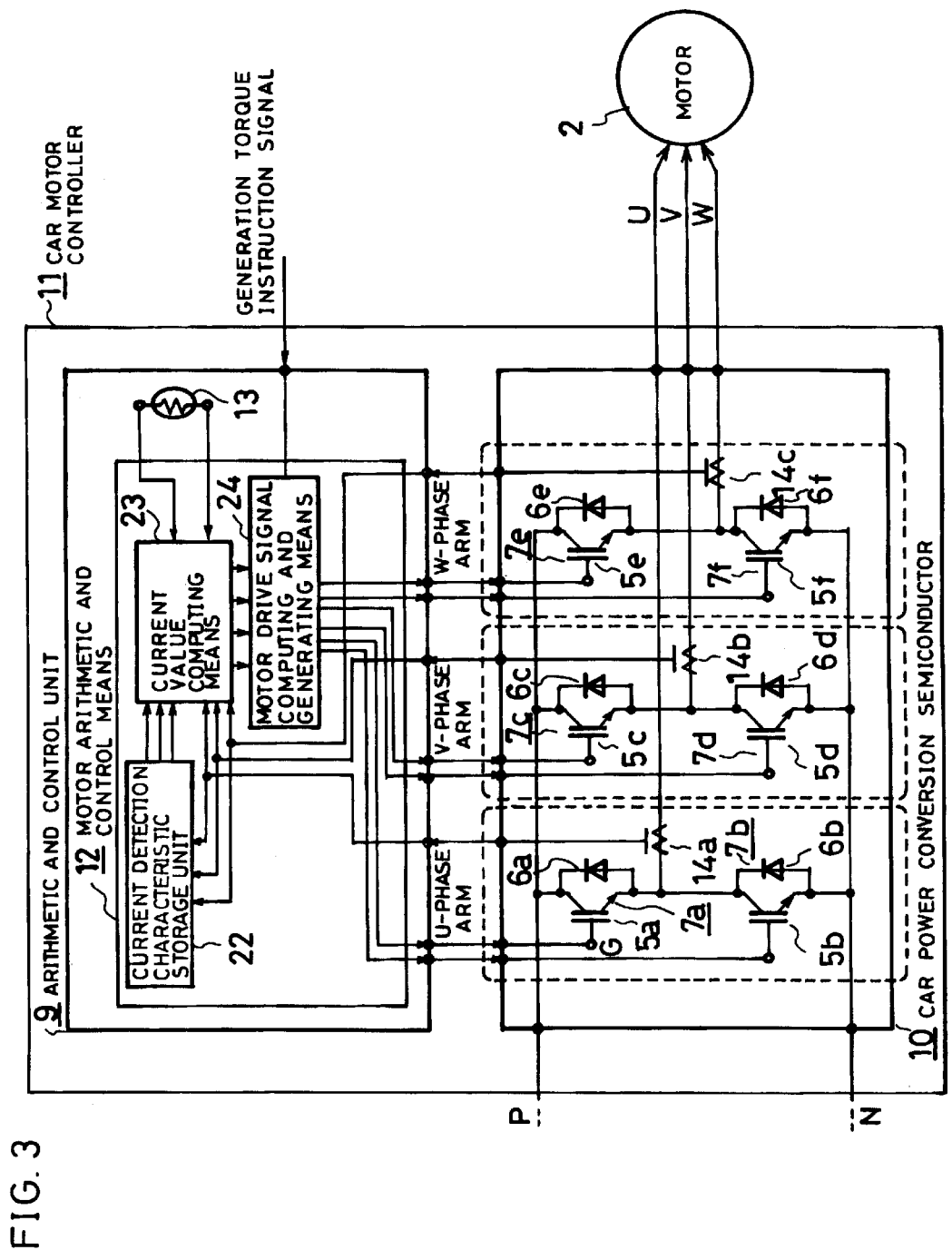
FIG. 3 is a block diagram showing the constitution of the motor controller according to Embodiment 1 of the present invention.

In FIG. 3, reference numeral 22 denotes a current detection characteristic compensation data storage unit, 23 current value computing means, and 24 motor drive signal computing and generating means.

The three phase current detection signals detected by the current detectors 14 are input into the current value computing means 23 which in turn corrects the three phase current detection signals using the current detection characteristic compensation data for compensating for fluctuations in the characteristics of the current detectors 14 prestored in the current detection characteristic compensation data storage unit 22 so as to computes three phase current values.

At the same time, a signal from the ambient temperature detector 13 is input into the current value computing means 23 to detect the ambient temperature of the arithmetic and control unit 9. The current value computing means 23 corrects three phase current detection signals from the current detectors 14 using the current detection characteristic compensation data for compensating for changes in the constants of electronic circuit parts caused by temperature variations prestored in the current detection characteristic compensation data storage unit 22 according to the ambient temperature to compute three phase current values.

The motor drive signal computing and generating means 24 receives the current values from the current value computing means 23, carries out an operation for driving the motor to generate gate drive signals for switching the switching elements 5 and outputs them.

The detection signals from the current detectors 14 contain errors caused by fluctuations in the characteristics of the current detectors 14 and changes in the constants of electronic circuit parts in the arithmetic and control means 12 caused by temperature variations. In this embodiment, the storage unit 22 for prestoring current detection characteristic compensation data for compensating for these errors is provided to compute current values using the current detection characteristic compensation data. Therefore, the control of the motor which makes the generation torquer τm of the motor 2 equal to a torque instruction value τm* can be made stable and highly reliable by reducing fluctuations in the characteristics of the current detectors 14 which occur during production and the influence of temperature variations upon electronic circuit parts in the arithmetic and control means 12.

Compensation for changes in the constants of electronic circuit parts caused by temperature variations and compensation for fluctuations in the characteristics of the current detectors 14 based on ambient temperature may be carried out simultaneously or separately. Only one of the compensations may be made possible. Further, the current detection characteristic compensation data for compensating for these are prestored in the storage unit 22 but may be prestored in different storage units.

The current detection characteristic compensation data for compensating for both changes in the constants of electronic circuit parts and fluctuations in the characteristics of the current detectors 14 or the current detection characteristic compensation data for compensating for only fluctuations in the characteristics of the current detectors 14 may be stored in one ROM, thereby making it possible to define each area of the storage unit 22 and change only a specific area with ease. Therefore, the type of a vehicle and the country where the vehicle is used can be set and changed with ease in connection with corrections for the detection of current values, thereby making it possible to maintain high current detection accuracy while reducing complicatedness.

Embodiment 2

Embodiment 2 of the present invention will be described hereinunder.

Figure 4:
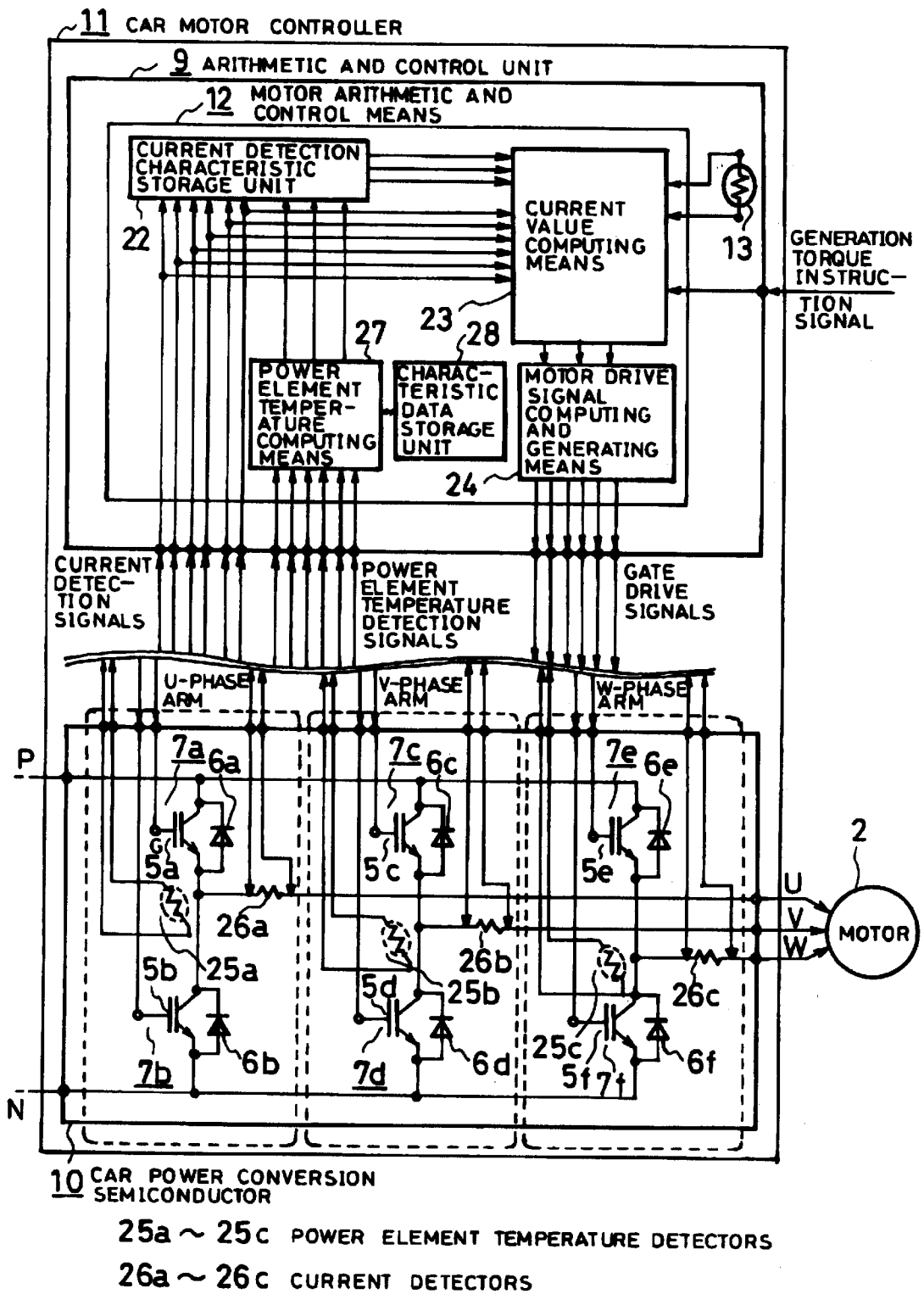
FIG. 4 is a block diagram showing the constitution of a motor controller according to Embodiment 2 of the present invention.

FIG. 4 is a block diagram showing the constitution of a motor controller according to Embodiment 2 of the present invention. The same or corresponding elements as in FIGS. 1 to 3 are given the same reference symbols.

As shown in the figure, power element temperature detectors 25 (25a to 25c) are arranged near the upper and lower power elements 7 of each phase, and current detectors 26 (26a to 26c) for detecting U-phase, V-phase and W-phase currents are arranged on power lines for connecting the power elements 7 to the motor 2, composed of elements having resistance characteristics, situated near the power elements 7 on the same substrate as the power elements 7 and built in the power conversion semiconductor 10.

The arithmetic and control means 12 comprises power element temperature computing means 27 and a temperature detection characteristic storage unit 28 for prestoring data on the characteristics of the temperature detectors 25 for computing the temperatures of the power elements.

A description is subsequently given of the operation of the motor controller of Embodiment 2.

Power element temperature detection signals detected by the power element temperature detectors 25 are input into the power element temperature computing means 27. The power element temperature computing means 27 computes the temperatures of the power elements of each phase based on the data on the characteristics of the power element temperature detectors 25 prestored in the temperature detection characteristic storage unit 28 according to the input U-, V- and W-phase power element temperature detection signals.

The power element temperature detectors 25 are composed of temperature detecting diodes, for example, which are arranged to detect the temperatures of the power elements to prevent the overheating of the switching elements 5. Since the current detectors 26 are arranged near the power elements 7 so that they are close to the temperature detectors 25, the temperatures of the power elements detected by the power element temperature detectors 25 can be used as the temperature s of the current detectors 26.

Three phase current detection signals detected by the current detectors 26 are input into the current value computing means 23. Since the current detectors 26 have resistance characteristics, potential differences between both ends of each resistance when three-phase AC runs through the current detectors 26 become current detection signals.

The current value computing means 23 corrects the three phase current detection signals from the current detectors 26 using current detection characteristic compensation data prestored in the current detection characteristic compensation data storage unit 22 according to the temperatures of the power elements of each phase from the power element temperature computing means 27 to compute three phase current values. The current detection characteristic compensation data prestored in the current detection characteristic compensation data storage unit 22 are data for compensating for fluctuations in the characteristics of the current detectors 26 caused by temperature variations.

Like the above Embodiment 1, a signal from the ambient temperature detector 13 is input into the current value computing means 23 to detect the ambient temperature of the arithmetic and control unit 9. The current value computing means 23 corrects three phase current detection signals from the current detectors 26 using the current detection characteristic compensation data for compensating for changes in the constants of electronic circuit parts prestored in the current detection characteristic compensation data storage unit 22 according to the ambient temperature to compute three phase current values.

The motor drive signal computing and generating means 24 receives the current values from the current value computing means 23, carries out an operation for driving the motor as described above to generate gate drive signals for switching the switching elements 5 and outputs them.

In this embodiment, since elements having resistance characteristics are used as the current detectors 26, the current detectors 26 and the power elements 7 can be arranged on the same substrate with ease. However, they are easily affected by changes in ambient environment, particularly temperature variations, whereby errors contained in current detection signals caused by temperature variations as well as fluctuations in the characteristics of the current detectors 26 become large. To eliminate the errors, the power element temperature detectors 25 are used to detect the temperatures of the current detectors 26 and current values are computed by correcting the detected temperatures using the prestored current detection characteristic compensation data. Therefore, highly accurate and highly reliable current values are obtained. Correction based on the ambient temperature from the ambient temperature detector 13 is also carried out to reduce the influence of temperature variations upon the electronic circuit parts in the arithmetic and control means 12, thereby making possible stable and highly reliable control.

Data on the characteristics of the power element temperature detectors 25 are prestored in the temperature detection characteristic storage unit 28 and the power element temperature computing means 27 computes the temperatures of the power elements of each phase using the data on the characteristics of the power element temperature detectors 25 according to power element temperature detection signals from the power element temperature detectors 25. Since the data on the characteristics of the power element temperature detectors 25 include actual data connected with an ambient temperature obtained from the ambient temperature detector 13 and are used for temperature computation, highly reliable and highly accurate temperature detection can be made by the power element temperature detectors 25, thereby further improving the accuracy of current values computed by the current value computing means 23.

In this embodiment, the current detectors 26 are arranged near the power elements 7 to use detection temperatures from the power element temperature detectors 25 as the temperatures of the current detectors 26. The temperature detectors may be arranged near the current detectors 26 for detecting three phase currents to detect the temperatures of the current detectors 26.

Embodiment 3

As for the data on the characteristics of the power element temperature detectors 25 used for the computation of temperatures by the power element temperature computing means 27 and prestored in the temperature detection characteristic storage unit 28 in the above Embodiment 2, a characteristic map and a method of storing characteristics will be described with reference to the accompanying drawings.

Figure 5:
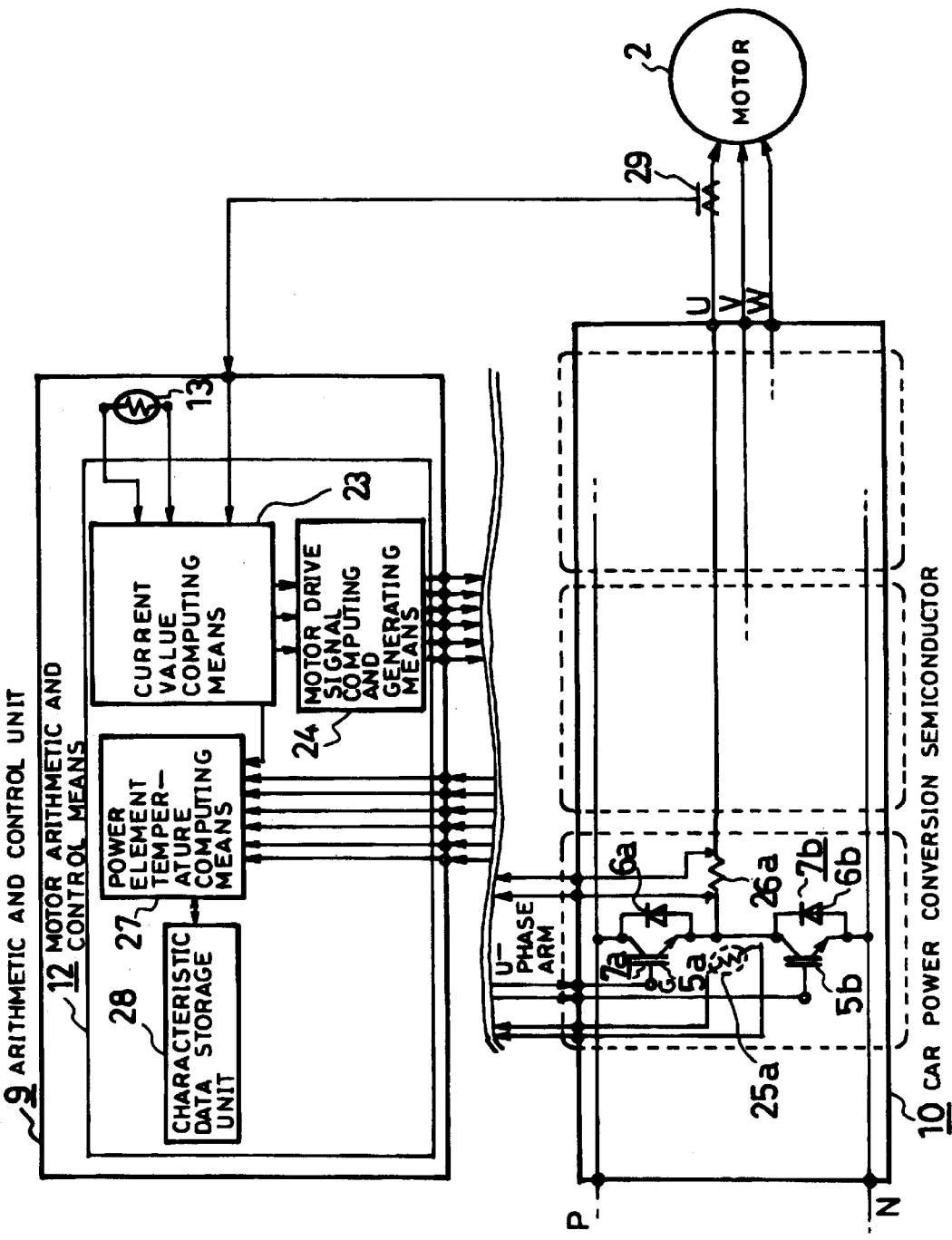
FIG. 5 is a block diagram showing the constitution of a motor controller according to Embodiment 3 of the present invention at the time of creating temperature detection characteristic data.

The arithmetic and control means 12 comprises means of creating the above characteristic data and storing them, and the creation and storage of the data are carried out prior to the control operation of the motor 2. FIG. 5 is a block diagram of a system used for the preparation of a characteristic map of the power element temperature detectors 25. For convenience sake, V-phase and W-phase elements are omitted and the same or corresponding elements as in FIG. 4 are given the same reference symbols. The arithmetic and control means. 12 is the same as that shown in FIG. 2. In FIG. 5, reference numeral 29 denotes a highly accurate current detector for detecting a three phase current actual value, which is arranged external to the power conversion semiconductor 10.

Figure 8:
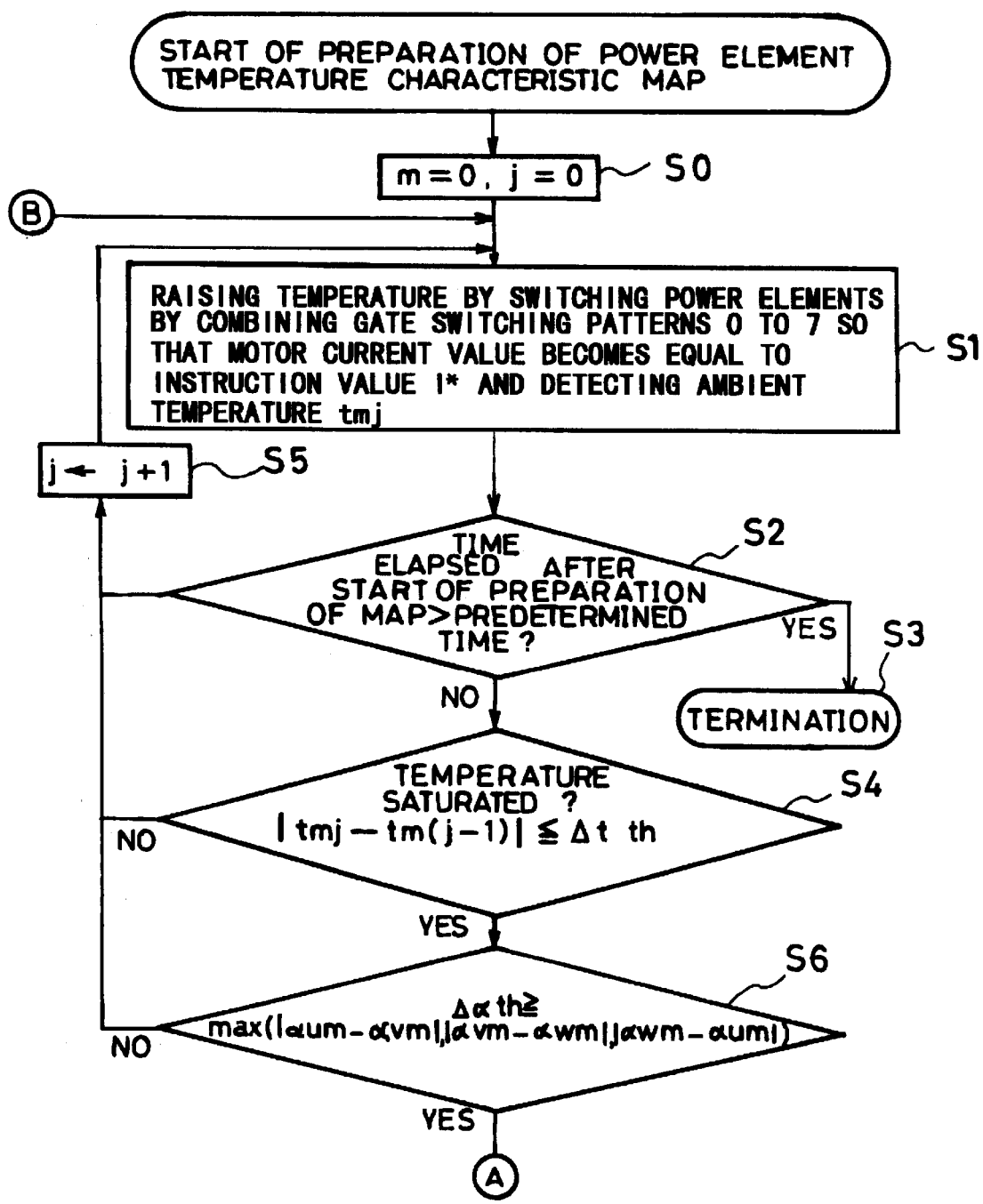
FIG. 8 is a flow chart showing the creation and storage processes of temperature detection characteristic data by the motor controller according to Embodiment 3 of the present invention.
Figure 9:
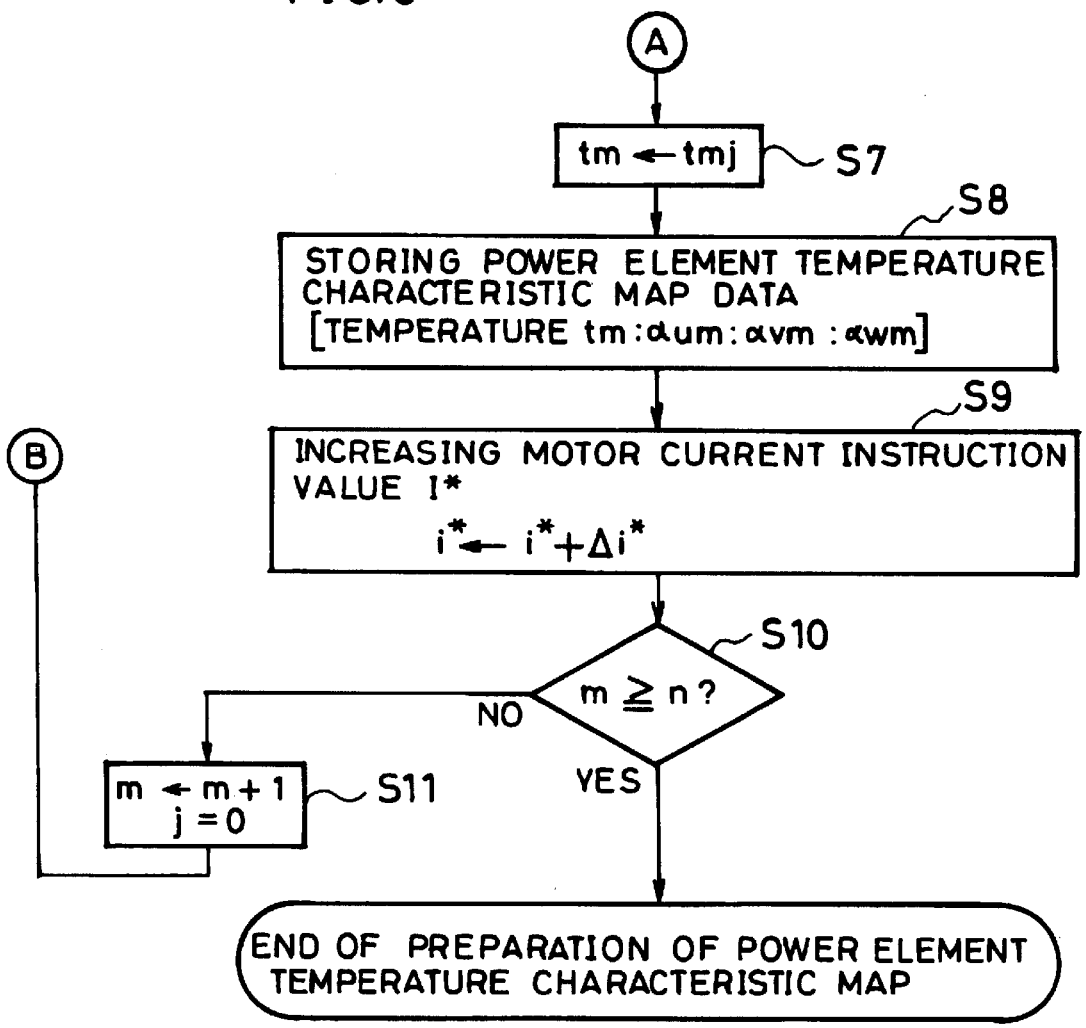
FIG. 9 is a flow chart showing the creation and storage processes of temperature detection characteristic data by the motor controller according to Embodiment 3 of the present invention.

FIG. 6 is a diagram showing patterns for switching the switching elements 5a to 5f when a power element temperature characteristic map is prepared. FIG. 7 is a power element temperature detection characteristic map as data on the characteristics of the power element temperature detectors 25 stored in the temperature detection characteristic storage unit 28. FIG. 8 and FIG. 9 are flow charts for the preparation and storage processes of the power element temperature detection characteristic map.

The preparation and storage processes of the power element temperature detection characteristic map are carried out with the motor controller of the above Embodiment 2 by constructing the system shown in FIG. 5 and will be described herienunder with reference to the flow charts of FIG. 8 and FIG. 9.

To begin with, the operation temperatures of the arithmetic and control unit 9 and the power conversion semiconductor 10 are initially set to a temperature around normal temperature which is the lower limit of the operation temperature range of the power elements 7 and the values of m and n are set to an initial value "0" (S0).

The CPU 17 turns on or off the switching elements 5a to 5f by combining switching patterns 0 to 7 shown in FIG. 6. The combination of switching patterns is determined by a known chopping wave comparison sinusoidal waveform approximation PWM formation method through an operation described in the above Embodiment 1 so that three phase current values running through the motor 2, that is, three phase current actual values detected by the highly accurate current detectors 29 become equal to a predetermined instruction value i*. The purpose of supplying three phase currents is to adjust the temperatures of the power elements 7 by turning on the upper and lower switching elements 5 of U-, V- and W-phase arms uniformly. The switching patterns are not limited if they meet this purpose. Thus, the switching patterns 0 to 7 are combined to elevate the temperatures of the power elements 7 by switching and to detect the ambient temperature tmj of the arithmetic and control unit 9 by means of the ambient temperature detector 13 so that the motor current values become equal to the instruction value i* (S1).

Thereafter, it is judged whether the time elapsed after the start of the preparation of the power element temperature characteristic map is longer than a predetermined time (S2). When it is judged in S2 that the time is longer than the predetermined time, the preparation of the characteristic map is a failure so the processing is terminated (S3).

When it is judged in S2 that the time is not longer than the predetermined time, it is judged whether the temperatures of the power elements are saturated and steadied. This is made by judging whether the difference $|\Delta tmj|(=|tmj-tm(j-1)|)$ between the ambient temperature tm(j-1) of the arithmetic and control unit 9 sampled previously and the ambient temperature tmj of the arithmetic and control unit 9 sampled this time is equal to or smaller than a predetermined temperature saturation decision threshold value $\Delta tth$. The temperature saturation decision threshold value $\Delta tth$ is set to an appropriate value which makes the ambient temperature equal to the temperatures of the power elements of each phase. When j=0, the above judgment is not made and the routine proceeds to S5 (S4).

When it is judged in S4 that $|\Delta tmj|>\Delta tth$, namely, the temperature is not saturated yet, 1 is added to j (S5) and the routine returns to S1 to detect the ambient temperature tmj for the next cycle.

When it is judged in S4 that $|\Delta tmj| \leq \Delta tth$, namely, the temperature is saturated, it is judged whether detection signals (U-phase αum, V-phase αvm, W-phase αwm) from the power element temperature detectors 25a to 25c are appropriate or not. This is made by judging whether the differences among the detection signals are equal to or smaller than a predetermined U-, V- and W-phase temperature detection value saturation decision threshold value $\Delta \alpha th$ (S6).

When it is judged in S6 that $\Delta \alpha th < \max (|\alpha um-\alpha vm|, |\alpha vm-\alpha wm|, |\alpha wm-\alpha um|)$, namely, the detection signals are not appropriate, 1 is added to j and the routine returns to S1 (S5).

When it is judged in S6 that $\Delta \alpha th \leq \max (|\alpha um -\alpha vm |, S1\alpha vm-\alpha wm|, |\alpha wm-\alpha um|)$, namely, the detection signals are appropriate, the ambient temperature tmj is read as the power element temperature tm (S7), and the power element temperature tm, U-phase power element temperature detection value αum, V-phase power element temperature detection value αvm and W-phase power element temperature detection value αwm are stored in the m-th line of the power element temperature detection characteristic map (see FIG. 7) (S8).

Subsequently, to create data for the (m+1)-th line of the power element temperature detection characteristic map, $\Delta i^*$ is added to the three phase current instruction value i* running through the motor 2 to increment the instruction value. $\Delta i^*$ is set to an appropriate value for increasing the power element temperature tm which is the m-th line data computed from the ambient temperature to the power element temperature tm+1 which is the (m+1)-th line data (S9).

Subsequently, it is judged whether the characteristic map which covers the upper limit value of a temperature range that requires the detection of the temperatures of the power elements is prepared. This is made by judging whether m is equal to or larger than a predetermined value n (S10). When m<n, 1 is added to m, j is returned to the initial value "0" (S11), and then the routine returns to S1.

When m≧n in S10, the power element temperature characteristic map for a required temperature range is prepared so the processing is terminated.

According to the above processing flow, the power element temperature detection characteristic map is prepared and stored in the temperature detection characteristic storage unit 28 and used as prestored data on the characteristic of the power element temperature detectors 25 by the power element temperature computing means 27 for temperature computation when the arithmetic and control unit 12 of the motor controller 11 is in operation.

That is, the power element temperature computing means 27 computes the temperatures of the power elements of each phase from the U-, V- and W-phase power element temperature detection signals with reference to the power element temperature detection characteristic map. For example, the computation of the U-phase power element temperature is carried out as follows. Based on the detection value αux of the U-phase power element temperature detector 25a, two elements on a low temperature side and a high temperature side sandwiching αux are selected from the sequence of U-phase elements of the power element temperature detection characteristic map shown in FIG. 7. The element on the low temperature side is designated αum and a temperature corresponding to this is designated tm. The element on the high temperature side is designated αu(m+1) and a temperature corresponding to this is designated tm+1. The power element temperature tux when the detection value is αux is computed from the equation tux=(tm+1−tm)×(αux−αum)/(αu (M+1)−αum)+tm by proportional computation. The V-phase and W-phase power element temperatures are computed likewise.

The characteristic data of the power element temperature detection characteristic map are data connected with an ambient temperature from the ambient temperature detector 13, and the temperatures of the power elements can be computed accurately from detection signals from the power element temperature detectors 25a to 25c of each phase based on the characteristic data using the ambient temperature.

The characteristic data for each phase may be created by sampling data on the characteristics of the U-, V- and W-phase power element temperature detectors 25a to 25c separately.

In this embodiment, the ambient temperature from the ambient temperature detector 13 is used as the standard temperature. The present invention is not limited to this if highly reliable temperature data can be detected with ease. In this case, a temperature detector may be provided for each phase, thereby further improving the accuracy of the characteristic data.

Further, the temperatures of the power elements computed by the power element temperature computing means 27 based on the data on the characteristics of the power element temperature detectors 25 can be used not only as the temperatures of the current detectors 26 but also as the temperatures of the power elements for preventing the overheating of the switching elements 5. As a result, the temperatures of the power elements can be detected with high accuracy, thereby improving the reliability of preventing overheating.

Embodiment 4

As for data for compensating for fluctuations in the characteristics of the current detectors 26 caused by temperature variations stored in the current detection characteristic compensation data storage unit 22 in the above Embodiment 2, characteristic maps as compensation maps and the method of storing the characteristics will be described with reference to the accompanying drawings.

The arithmetic and control means 12 comprises means of creating and storing the current detection characteristic compensation data, and the preparation and storage of the current detection characteristic compensation data are carried out prior to the control operation of the motor 2. The power element temperature detection characteristic map is prepared by the processing shown in the above Embodiment 3 and stored in the temperature detection characteristic storage unit 28.

Figure 10:
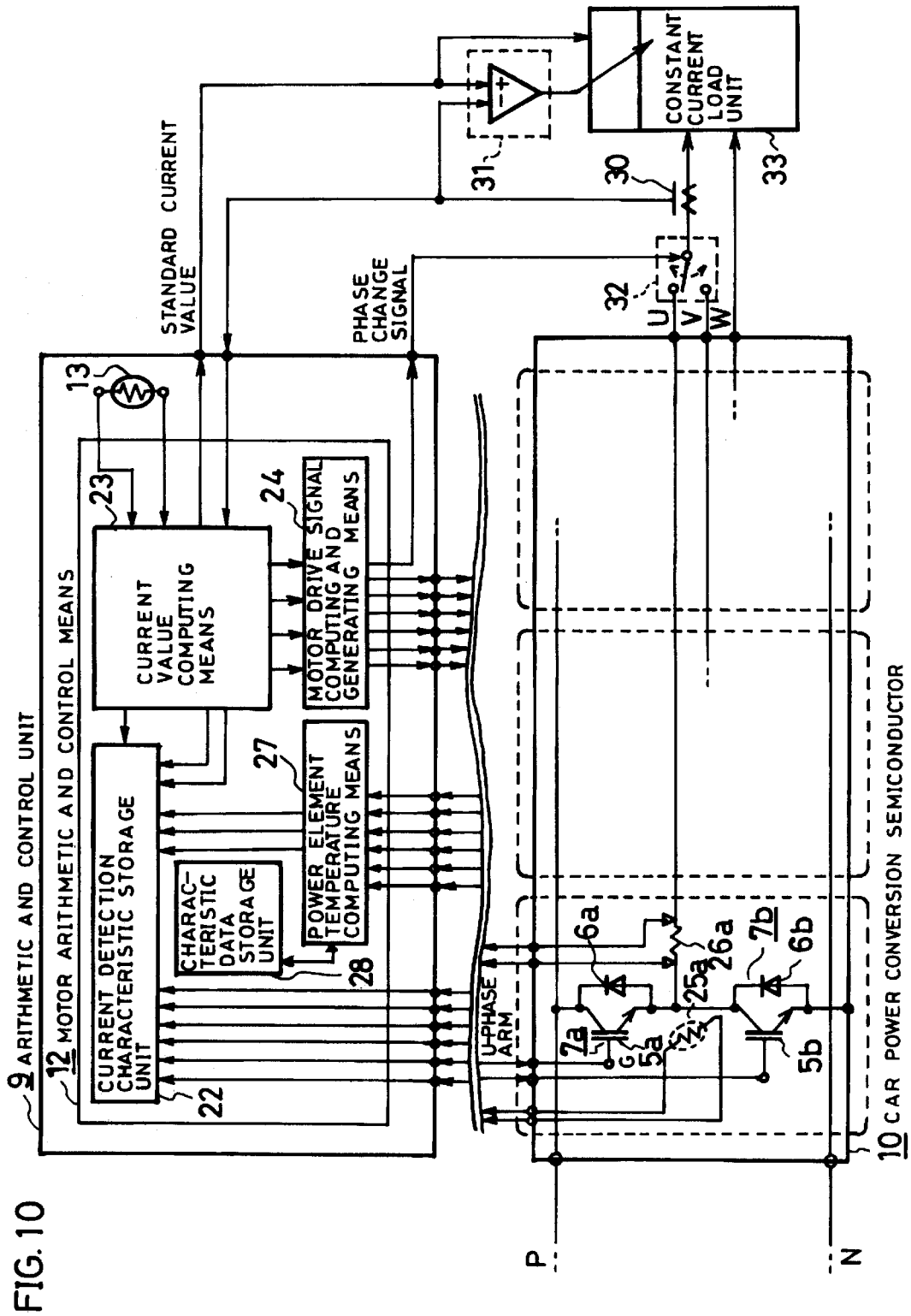
FIG. 10 is a block diagram showing the constitution of a motor controller according to Embodiment 4 of the present invention at the time of creating current detection characteristic data.

FIG. 10 is a block diagram showing the constitution of a system for preparing the characteristic maps of the current detectors 26. For convenience sake, V-phase and W-phase elements are omitted in the figure and the same or corresponding elements as in FIG. 4 are given the same reference symbols. The arithmetic and control means 12 is the same as that shown in FIG. 2. In FIG. 10, reference numeral 30 denotes a highly accurate current detector for detecting a current actual value, which is arranged external to the power conversion semiconductor 10, 31 current difference output unit, 32 phase shifter and 33 constant current load unit connected to the power conversion semiconductor 10 in place of the motor 2 at the time of preparing the characteristic maps.

Figure 13:
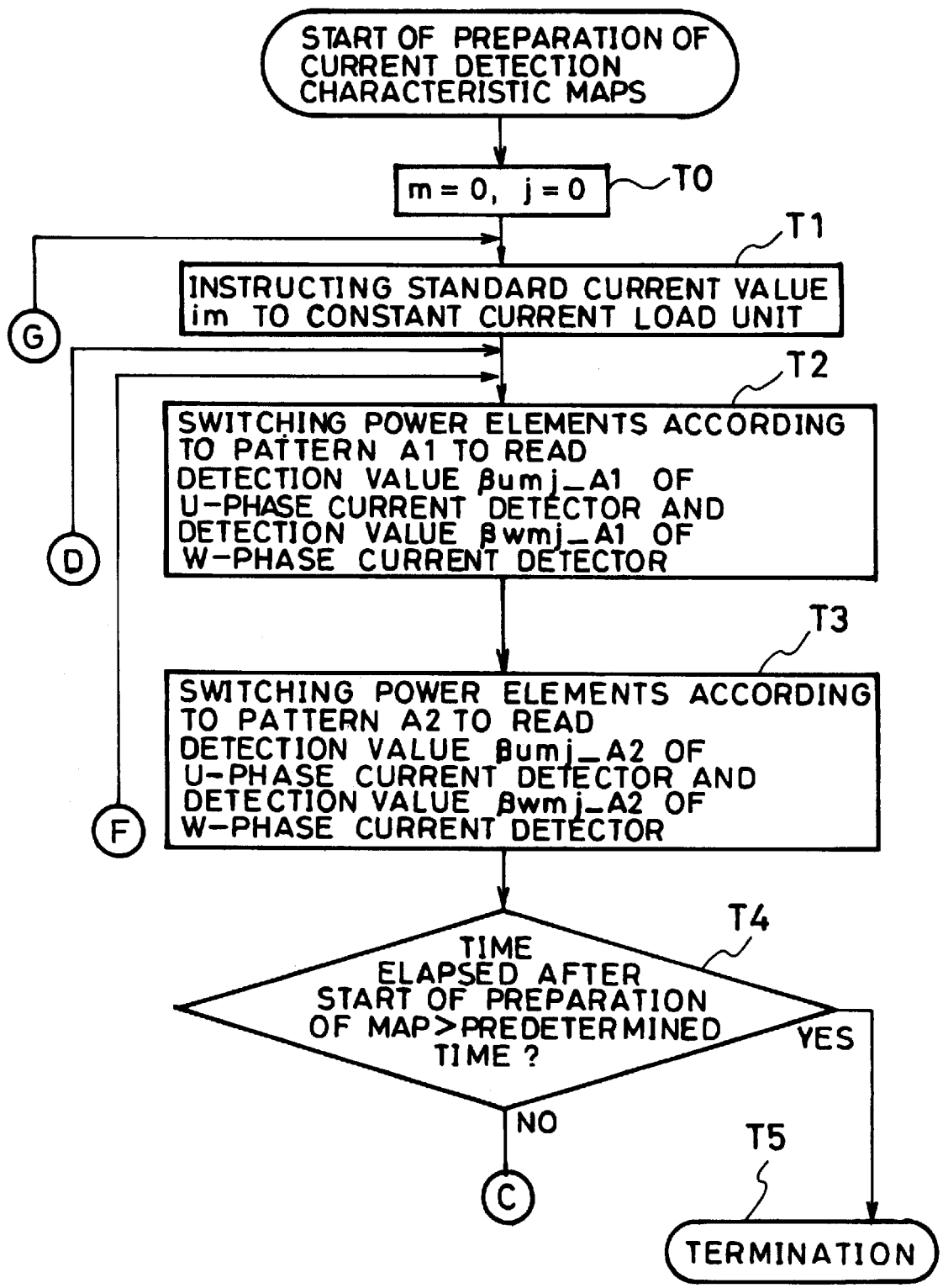
FIG. 13 is a flow chart showing the creation and storage processes of current detection characteristic data by the motor controller according to Embodiment 4 of the present invention.
Figure 14:
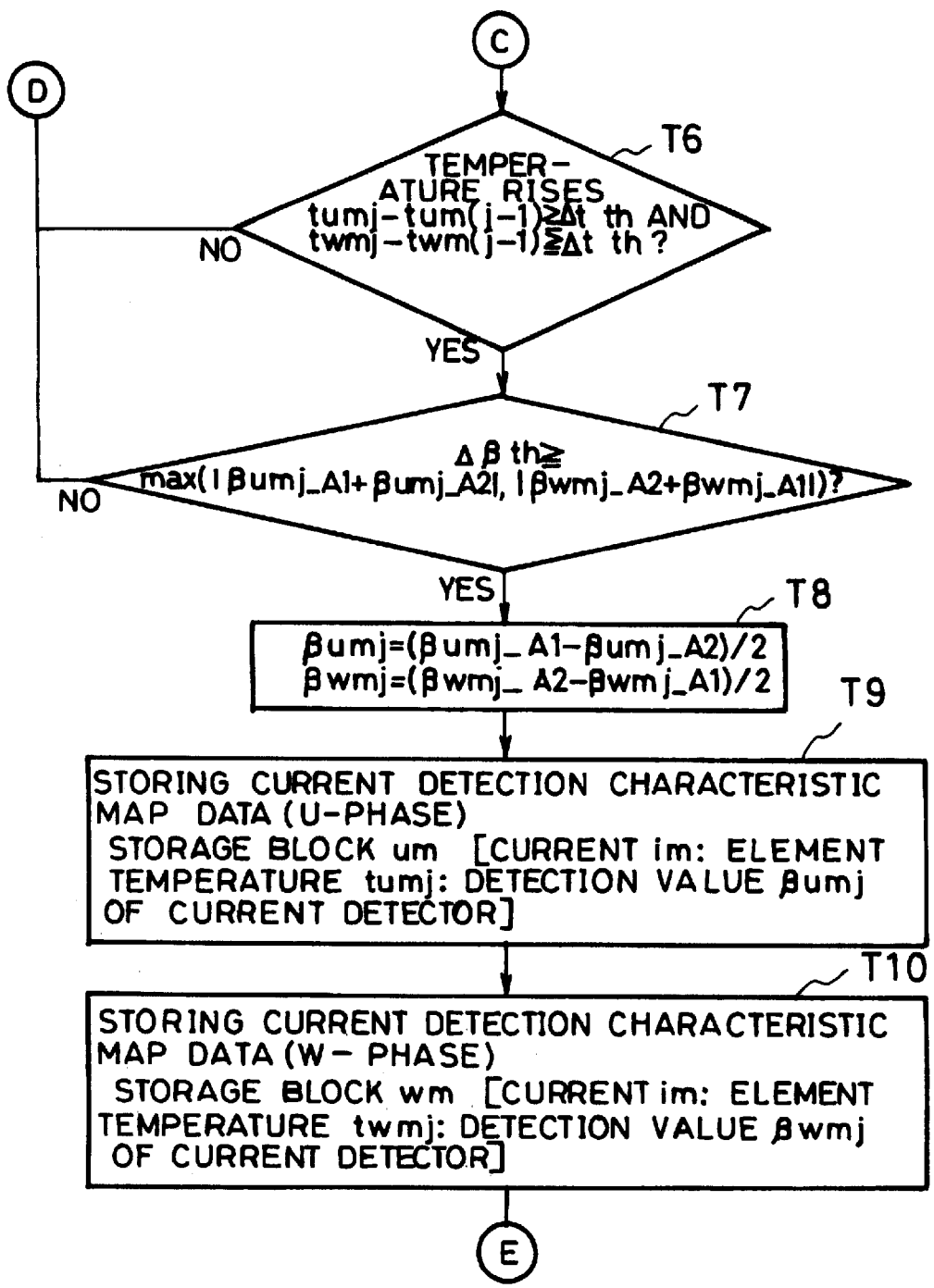
FIG. 14 is a flow chart showing the creation and storage processes of current detection characteristic data by the motor controller according to Embodiment 4 of the present invention.
Figure 15:
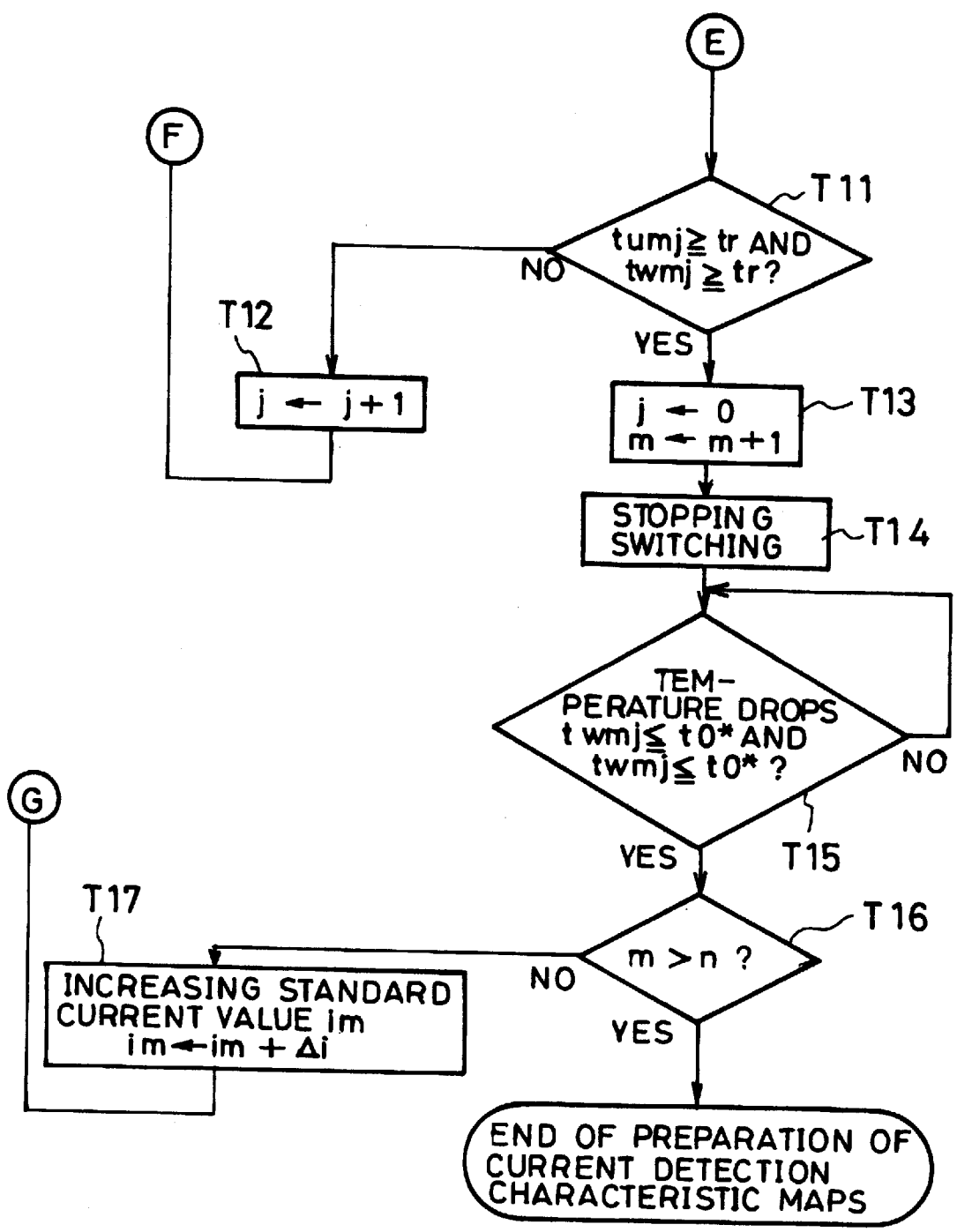
FIG. 15 is a flow chart showing the creation and storage processes of current detection characteristic data by the motor controller according to Embodiment 4 of the present invention.

FIG. 11 is a diagram showing patterns for switching the switching elements 5a to 5f at the time of preparing current detection characteristic maps. FIG. 12 shows current detection characteristic maps which contain current detection characteristic compensation data stored in the current detection characteristic compensation data storage unit 22 as U-, V- and W-phase detection characteristic maps. FIGS. 13 to 15 are flow charts showing the preparation and storage processes of U- and W-phase characteristic maps out of the current detection characteristic maps.

The preparation and storage of U- and W-phase current detection characteristic maps are carried out with a system shown in FIG. 10 by the motor controller 11 according to the above Embodiment 2 and will be described hereinunder with reference to the flow charts of FIGS. 13 to 15.

To begin with, the operation temperatures of the arithmetic and control unit 9 and the power conversion semiconductor 10 are initially set to a temperature around normal temperature which is the lower limit of the operation temperature range of the power elements 7 and the values of m and n are set to an initial value "0"(T0).

The arithmetic and control means 12 sets a standard current value im in the constant current load unit 33 as a load current instruction value. The actual current is detected by the highly accurate current detector 30 and output to the current difference output unit 31 and the current value computing means 23. The current difference output unit 31 computes a difference between the standard current value im and the actual current value and outputs it to the constant current load unit 33. The constant current load unit 33 finely adjusts a load current based on this input.

Thereafter, the switching elements 5a and 5f are turned on and other switching elements are turned off according to the switching pattern A1 shown in FIG. 11 to supply a direct current (=standard current value im) from the U phase to the W phase of the power conversion semiconductor 10. The detection value βumj__A1 of the U-phase current detector 26a and the detection value βwmj__A1 of the W-phase current detector 26c at this point are read. The phase shifter 32 is connected to the U-phase side so that a current runs between U and W phases.

Thereafter, the switching elements 5b and 5e are turned on and other switching elements are turned off according to the switching pattern A2 shown in FIG. 11 to supply a direct current from the W phase to the U phase of the power conversion semiconductor 10. The detection value βumj__A2 of the U-phase current detector 26a and the detection value βwmj__A2 of the W-phase current detector 26c at this point are read (T3).

Subsequently, it is judged whether the time elapsed after the start of the preparation of current detection characteristic maps is longer than a predetermined time (T4). When it is judged in T4 that the time is longer than the predetermined time, the preparation of the characteristic maps is a failure so it is terminated (T5).

When it is judged in T4 that the time is shorter than the predetermined time, it is judged whether the U-phase power element temperature tumj and the W-phase power element temperature twmj are higher than the previous power element temperatures tum(j−1) and twm(j−1) at the time of storing data by a predetermined temperature rise decision threshold value Δtth (data graduations on the temperature axes of the characteristic maps). The U-phase power element temperature tumj and the W-phase power element temperature twmj are computed from the detection signals of the power element temperature detectors 25a and 25b by the power element temperature computing means 27 based on data on the characteristic of the power element temperature detectors 25 stored in the temperature detection characteristic storage unit 28. When j=0, the above judgment is not made and the routine proceeds to T7 (T6).

When it is judged in T6 that (tumj−tum(j−1)<Δtth) or (twmj−twm(j−1)≦Δtth) and that the temperatures of the power elements do not rise more than the data graduations on the temperature axes of the characteristic maps, the routine returns to T2.

When it is judged in T6 that(tumj−tum(j−1)<Δtth or (twmj−twm(j−1)≧AΔth) and that the temperatures of the power elements rise more than the data graduations on the temperature axes of the characteristic maps, it is judged whether the U-phase current detection values βumj__A1 and βumj__A2 and the W-phase current detection values βwmj__A1 and βwmj__A2 are appropriate values or not. This is made by judging whether the difference between the detection signals is smaller than a predetermined value Δβth (current detector detection value convergence decision threshold value) (T7).

When it is judged in T7 that $\Delta\beta th < \max(|\beta umj\_A1 + \beta umj\_A2|, |\beta wmj\_A2 + \beta wmj\_A1|)$ and that the detection signals are not appropriate, the routine returns to T2.

When it is judged in T7 that $\Delta\beta th \geq \max(|\beta umj\_A1 + \beta umj\_A2|, |\beta wmj\_A2 + \beta wmj\_A1|)$ and that the detection signals are appropriate, the mean of the U-phase current detection value $\beta umj\_A1$ when a current runs from the U phase to the W phase and the U-phase current detection value $\beta umj\_A2$ when a current runs from the W phase to the U phase is taken as $\beta umj$. The mean of the W-phase current detection value $\beta wmj\_A2$ when a current runs from the W phase to the U phase and the W-phase current detection value $\beta wmj\_A1$ when a current runs from the U phase to the W phase is taken as $\beta wmj$. In both cases, the direction of a current running from the power conversion semiconductor 10 to the outside is a normal direction (T8).

Subsequently, the U-phase power element temperature tumj and the U-phase current detection value $\beta umj$ are stored in the um block of the U-phase characteristic map (see FIG. 12) out of the current detection characteristic maps. This means that when the U-phase power element temperature is tumj, the output signal of the current detector is $\beta umj$ if a current im runs through the U-phase current detector 26a (T9).

Thereafter, the W-phase power element temperature twmj and the W-phase current detection value $\beta wmj$ are stored in the wm block of the W-phase characteristic map like the U-phase characteristic map (T10).

It is then judged whether the temperatures of the power elements reach the upper limit value of the use temperature range of the power elements 7 and the number of data pieces required for the current detection characteristic maps are stored. This is made by judging whether(tumj$\geq$tr) and (twmj$\geq$tr). Tr is the upper limit value of the use temperature range of the power elements 7 (T11).

When it is judged in T11 that (tumj<tr) or (twmj <tr) and that the temperatures of the power elements do not reach the upper limit value of the use temperature range of the power elements 7, 1 is added to j (T12) and the routine returns to T2 to prepare current detection characteristic maps when the temperatures of the power elements 7 rise.

When it is judged in T11 that (tumj$\geq$tr) and (twmj $\geq$tr) and that the temperatures of the power elements reach the upper limit value of the use temperature range of the power elements 7, that is, the current im runs, data at the use temperature range of the power elements 7 are all collected. Therefore, the value of j is returned to "0", 1 is added to m (T13), and switching is stopped to adjust the temperatures of the power elements 7 to the lower limit value of the use temperature range of the power elements 7 (T14).

Thereafter, the temperatures of the U-phase power elements and the temperatures of the W-phase power elements are computed from the detection values of the power element temperature detectors 25 and it is judged whether the temperatures of the power elements are reduced to the lower limit value t0* of the use temperature range which is the standard value of the 0-th element of the characteristic maps. When (tumj >t0*) or (twmj>t0*) and the temperatures are not sufficiently low yet, the temperatures of the U-phase power elements and the temperatures of the W-phase power elements are detected again to make the above judgement (T15).

When it is judged in T15 that (tumj$\leq$t0*) and (twmj$\leq$t0*) and that the temperatures are low, it is judged whether all the data for the U-phase current detection characteristic map and the W-phase current detection characteristic map are collected to complete the preparation of the maps. This is made by judging whether the value of m is larger than a predetermined value n. Data on an n-th line is data on the last line of the current detection characteristic map and data on the greatest current out of currents required by the current detectors 25 (T16).

When it is judged in T16 that m$\geq$n and all the data for the current detection characteristic maps are not collected, $\Delta$im which is a graduation value on the current axis of the current detection characteristic map is added to a load current value im instructed to the constant current load unit 33 to create data for the next line and the routine returns to T1 (T17).

When it is judged in T16 that m>n and all the data for the current detection characteristic maps are collected, the preparation of the U-phase and W-phase current detection characteristic maps is completed and the routine ends.

The U-phase and W-phase current detection characteristic maps are prepared by the above processing flow. As for the preparation of the V-phase current detection characteristic map, the U-phase is substituted by the V-phase in the flow charts showing the preparation and storage processes of the U-phase and W-phase characteristic maps of FIGS. 13 to 15, the phase shifter 32 is connected to the V-phase side, and the switching elements are switched according to the switching patterns B1 and B2 shown in FIG. 11.

At the time of the control operation of the motor 2 in the motor controller 11, the current value computing means 23 computes U-, V- and W-phase current values from the detection signal values of the current detectors 26 using the U-, V- and W-phase current detection characteristic compensation data with reference to the U-, V- and W-phase current detection characteristic maps stored in the current detection characteristic compensation data storage unit 22.

For example, the computation of the U-phase current value is carried out by the following procedure.

In the U-phase current detection characteristic map shown in FIG. 12, two elements on a high temperature side and a low temperature side sandwiching the U-phase power element temperature tux obtained from the power element temperature computing means 27 and the closest to each other in value are selected for each storage block from elements in the storage blocks u0 to un. Then, a pair of elements sandwiching the detection signal value $\beta$ux of the U-phase current detector 26a are selected from the selected pairs of elements in the storage blocks u0 to un. Thereby, two pairs of elements in the adjacent two storage blocks um and u(m+1) are selected, that is, four data pieces sandwiching the U-phase power element temperature tux and the detection signal value $\beta$ux are selected from the elements of the U-phase current detection characteristic map.

When the above four data pieces are expressed in the terms of (storage block, power element temperature, current detection value), they are (um, tumj, $\beta$umj), (um, tum(j+1), $\beta$um(j+1)), (u(m+1), tu(m+1)j, $\beta$u(m+1)j) and (u(m+1), tu(m+1)(j+1), $\beta$u(m+1)(j+1)).

Thereafter, the current detection value at the U-phase power element temperature tux in the storage block um is computed by interpolation using tumj, tum(j+1), $\beta$umj and $\beta$um(j+1) and designated $\beta$um. At this point, $\beta$um indicates a U-phase current detection value when a current im runs at the U-phase power element temperature tux. Linear interpolation is carried out by proportional computation based on the equation $\beta um = (\beta um(j+1) - \oplus umj) \times (tux - tumj)/(tum(j+1) - tumj) + \beta umj$.

Similarly, the current detection value at the U-phase power element temperature tux in the storage block u(m+1) is computed by interpolation using tu(m+1)j, tu(m+1) (j+1), βu(m+1)j and βu(m+1) (j+1) and designated βu(m+1). At this point, βu(m+1) indicates a U-phase current detection value when a current i(m+1) runs at the U-phase power element temperature tux. Linear interpolation is carried out based on the equation βu(m+1)=(βu(m+1)(j+1)−βu(m+1)j)× (tux−tu(m+1)j)/(tu(m+1)(j+1)−tu(m+1)j)+βu(m+1)j.

Finally, a U-phase current value iux when the U-phase current detection value is βux is computed from the equation iux=(i(m+1)−im)×(βux−βum)/(βu(m+1) −βum)+im. V-phase and W-phase current values are computed likewise.

As described above, since the current detection characteristic maps which include storage blocks according to current instruction values, power element temperatures and current detection values are prepared and stored in the current detection characteristic compensation data storage unit 22, current detection signals from the current detectors 26 contain errors caused by temperature variations in addition to fluctuations in the characteristics of the current detectors 26 but the errors can be eliminated by compensation with current detection characteristic compensation data from the storage unit 22, thereby making it possible to obtain highly accurate and highly reliable current values.

Since the switching operation of the power elements 7 at the time of preparing the current detection characteristic compensation data is carried out so that a direct current runs through the current detectors 26, the preparation of the current detection characteristic compensation data can be carried out with ease, and the data creation time can be shortened.

Embodiment 5

The case where the current detection characteristic compensation data stored in the storage unit are temperature compensation expressions will be described hereinunder. Since the constitution of the whole system excluding the storage of the current detection characteristic compensation data is the same as that of Embodiment 2, its description is omitted. FIG. 16 is a diagram of a compensation expression operation coefficient map when the current detection characteristic compensation data are temperature compensation expressions.

Since each of the current detectors 26 has resistance characteristics, the following relationship can be established among a current ik running through the current detector 26, the resistance Rtk of the current detector 26 and the detection value Vsen of the current detector 26. As described above, a potential difference between both ends of resistance when three-phase AC runs through the current detector 26 becomes a current detection signal (detection value Vsen).

$$ik = Vsen/Rtk \qquad (3)$$

The resistance Rtk changes by temperature and its characteristics are represented by the following expression:

$$Rtk = Rt(m-1) \cdot \{1 + \alpha tm \times 10^{-6} \times (tk - t(m-1))\} \qquad (4)$$

wherein tk, tm and t(m−1) are temperatures, with the proviso that t(m−1) <tk ≦tm, Rtk is a resistance at a temperature tk, Rt(m−1) is a resistance at a temperature t(m−1) and αtm is a temperature coefficient indicating the change rate of resistance/°C. at a temperature between t(m−1) and tm.

The temperature coefficient αtm is substantially a fixed value specific to the structural material of the current detectors 26. By setting the coefficient to an accurate value, the computation of an accurate current value is made possible. Therefore, the operation coefficients of the compensation expression (4) which are the current detection characteristic compensation data, that is, temperature coefficient αtm and resistance Rtm at each temperature are prestored in the current detection characteristic compensation data storage unit 22 as a compensation expression operation coefficient map shown in FIG. 16. A temperature coefficient αtm and a resistance Rtm are extracted from the compensation expression operation coefficient map of the current detection characteristic compensation data storage unit 22 according to power element temperature computed by the power element temperature computing means 27 at the time of the operation of the motor controller 11 to compute a resistance Rtk based on the above compensation expression (4) and further a current value ik based on the above expression (3) by means of the current value computing means 23.

Also in this embodiment, errors caused by fluctuations in the characteristics of the current detectors and temperature variations can be eliminated with the current detection characteristic compensation data from the storage unit 22, and highly accurate and highly reliable current values can be obtained like the above Embodiment 4.

Figure 17:
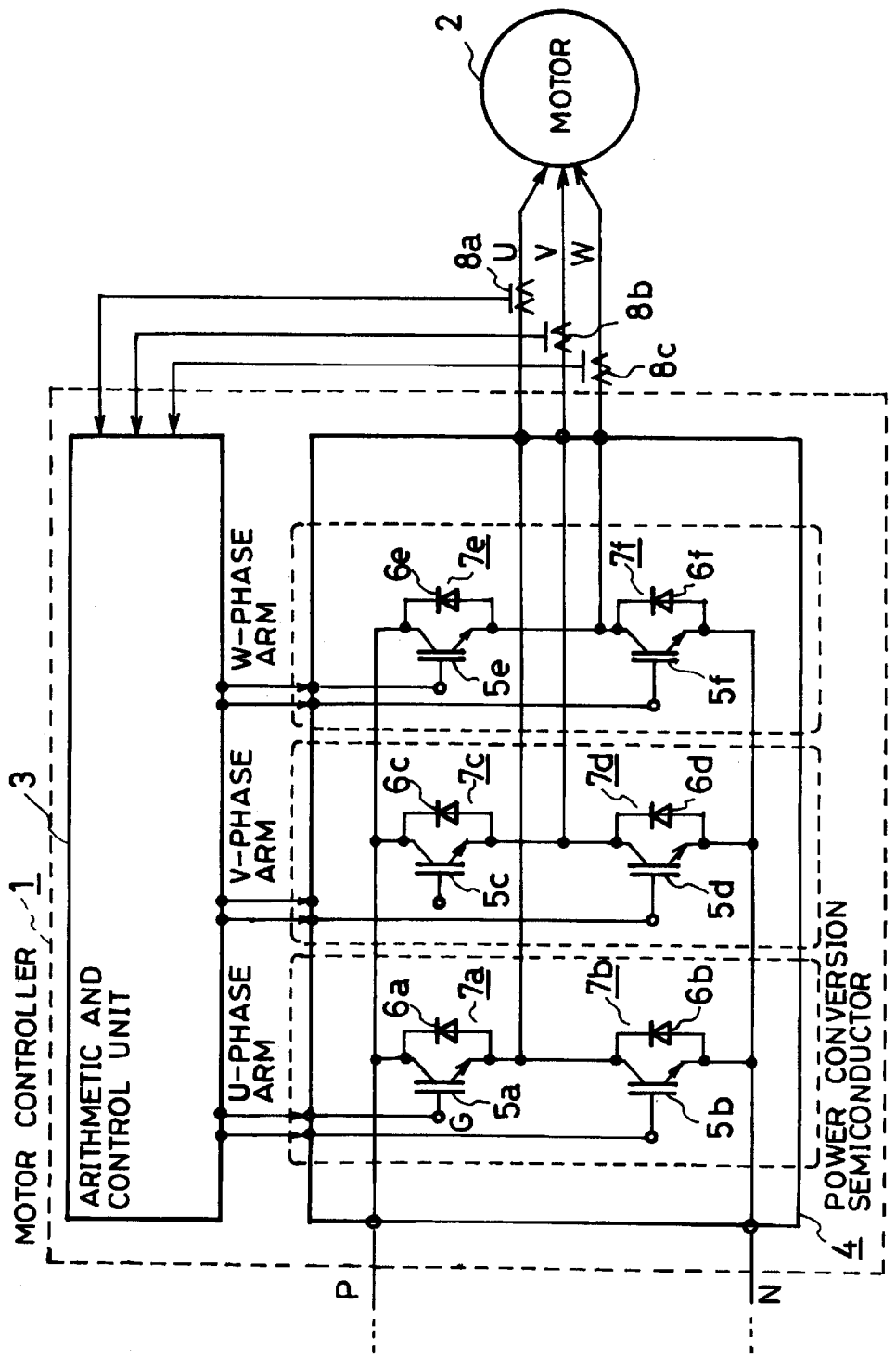
FIG. 17 is a block diagram showing the constitution of a motor controller of the prior art.

Since the compensation expression operation coefficient map shown in FIG. 17 makes it possible to expand the graduations on the temperature axis when variations in temperature coefficient a at the use temperature range of the current detectors 26, that is, the operation temperature range of the power elements 7 are small, the map can be composed of fewer elements than the current detection characteristic maps shown in FIG. 12 of the above Embodiment 4. The compensation expression operation coefficient map can be prepared by storing element temperature t, temperature coefficient a and resistance value R by the same processes as shown in the flow charts of FIGS. 13 to 15 like the preparation of the current detection characteristic maps shown in the above Embodiment 4. The resistance value R is obtained by the inverse operation of the above expression (3) and the temperature coefficient a is obtained by the inverse operation of the above expression (4).

As having been described above, according to the first aspect of the present invention, in the motor controller for controlling an application current to a motor, which comprises a power converter incorporating power elements, current detectors arranged on power lines for connecting the power elements to the motor, and an arithmetic and control unit for controlling the switching of the power elements using detection currents from the current detectors, the arithmetic and control unit comprises a storage unit for prestoring current detection characteristic compensation data for compensating for fluctuations in the characteristics of the current detectors, current value computing means for computing current values by correcting detection currents from the current detectors based on the current detection characteristic compensation data, and means for computing and generating drive signals for controlling the switching of the power elements based on the computed current values. Therefore, detection currents from the current detectors which form the basis of switching control can be detected with high reliability and high accuracy by compensating for errors caused by fluctuations in the characteristics of the current detectors, thereby improving controllability.

According to the second aspect of the present invention, in the motor controller for controlling an application current to a motor, which comprises current detectors arranged on power lines for connecting power elements in a power converter to the motor and an arithmetic and control unit for controlling the switching of the power elements using detection currents from the current detectors, the motor controller further comprises an ambient temperature detector for detecting the ambient temperature of the arithmetic and control unit and current value computing means for computing current values by correcting detection currents from the current detectors so that the arithmetic and control unit compensates for changes in the constants of electronic circuit parts in the arithmetic and control unit caused by temperature variations based on the detected ambient temperature. Therefore, the detection currents from the current detectors which form the basis of switching control can be detected with high reliability and high accuracy by compensating for errors caused by changes in the constants of the above electronic circuit parts, thereby improving controllability.

According to the third aspect of the present invention, an ambient temperature detector for detecting the ambient temperature of the arithmetic and control unit is provided, and current value computing means for computing current values by correcting detection currents from the current detectors based on current detection characteristic compensation data carries out a compensation operation for compensating for changes in the constants of the electronic circuit parts in the arithmetic and control unit caused by temperature variations based on the detected ambient temperature to compute the current values. Since the current value computing means for computing current values by correcting detection currents from the current detectors is provided, the detection currents from the current detectors which form the basis of switching control can be detected with high reliability and high accuracy by compensating for errors caused by fluctuations in the characteristics of the current detectors and changes in the constants of the electronic circuit parts, thereby further improving controllability.

According to the fourth aspect of the present invention, the current detectors are incorporated in the power conversion semiconductor, and the power conversion semiconductor and the arithmetic and control unit are stored in the same container. Therefore, the number of assembly steps, the number of constituent parts and the number of trouble possible sites are reduced, and further the influence of noise can be suppressed by a reduction in the lengths of signal paths between the current detectors and the arithmetic and control unit, thereby further improving the reliability of detection current values.

According to the fifth aspect of the present invention, the power converter and the arithmetic and control unit are stored in the same container, current detectors having resistance characteristics are used and stored in the above power converter, temperature detectors are provided near the current detectors, a storage unit prestores current detection characteristic compensation data for compensating for fluctuations in the characteristics of the current detectors caused by temperature variations, and current value computing means computes current values by correcting detection currents from the current detectors based on the current detection characteristic compensation data and detection temperatures from the above temperature detectors. Therefore, current values can be detected with high reliability and high accuracy by compensating for errors caused by fluctuations in the characteristics of the current detectors, which have resistance characteristics and can be easily stored in the power converter, caused by temperature variations, thereby further improving controllability.

According to the sixth aspect of the present invention, the current detectors are arranged near the power elements, and the temperature detectors also serve as power element temperature detectors for preventing the overheating of the power elements. Therefore, the temperatures of the current detectors can be detected by the power element temperature detectors with ease, thereby making it possible to improve the accuracy of the detection current values of the current detectors and prevent the overheating of the power elements and further to improve reliability with a simple structure.

According to the seventh aspect of the present invention, the characteristics of the temperature detectors are prestored as data connected with a detection temperature from the ambient temperature detector of the third aspect, and the arithmetic and control unit comprises temperature computing means for computing temperature from detection values from the temperature detectors based on data on the characteristics of the temperature detectors. Therefore, highly reliable data on the characteristics of the temperature detectors can be constructed with ease and temperature can be detected with high accuracy.

According to the eighth aspect of the present invention, the arithmetic and control unit comprises means of creating current detection characteristic compensation data prior to the control operation of the motor, and the characteristics of the current detectors are measured to create the above current detection characteristic compensation data for compensation for fluctuations in the characteristics and to store them in the storage unit. Therefore, the creation of the current detection characteristic compensation data for control can be easily carried out with the same apparatus as that at the time of the control operation of the motor, thereby making possible the efficient and highly-reliable control of the motor.

According to the ninth aspect of the present invention, the characteristics of the current detectors are measured to create the current detection characteristic compensation data, accompanied by the switching operation of the power elements. The creation of highly reliable data can be carried out effectively and easily.

According to the tenth aspect of the present invention, the arithmetic and control unit comprises means of creating the current detection characteristic compensation data prior to the control operation of the motor, and the characteristics of the current detectors are measured by controlling the switching operation of the power elements based on the detection temperatures of the temperature detectors to create the above current detection characteristic compensation data for compensating for fluctuations in the characteristics of the current detectors caused by temperature variations and to store them in the storage unit. Therefore, the creation of the current detection characteristic compensation data for control can be easily carried out with the same apparatus as that at the time of the control operation of the motor, the creation of highly reliable data can be carried out efficiently and easily, and the efficient and highly reliable control of the motor is made possible.

According to the eleventh aspect of the present invention, the switching operation of the power elements at the time of creating the current detection characteristic compensation data is carried out so that a direct current runs through the current detectors. Therefore, the creation of the current detection characteristic compensation data can be carried out with ease and the data creation time can be shortened.

According to the twelfth aspect of the present invention, the current detection characteristic compensation data are stored separately for each of the current detectors and the computation of current values by the current value computing means is carried out for each of the current detectors. Therefore, fluctuations in the characteristics of each of the current detectors can be compensated for and current values can be detected with high accuracy.

According to the thirteenth aspect of the present invention, the current detection characteristic compensation data are provided in the form of temperature compensation maps or temperature compensation expressions. Therefore, current detection characteristic compensation data for compensating for fluctuations in the characteristics of the current detectors caused by temperature variations can be obtained without failure.

According to the fourteenth aspect of the present invention, detection value data from the current detectors are collected together with temperature values detected by the temperature detectors of the fifth aspect such that the intervals between the temperature data values become a predetermined value with respect to an instruction current value running through the current detectors, and compensation maps are constructed with instruction current values, temperature data and detection value data collected by changing the instruction current value at predetermined intervals. Therefore, current detection characteristic compensation data for compensating for fluctuations in the characteristics of the current detectors caused by temperature variations can be easily obtained without failure.

What is claimed is:

1. A motor controller for controlling an application current to a motor, which comprises a power converter incorporating power elements, current detectors arranged on power lines for connecting the power elements to the motor, and an arithmetic and control unit for controlling the switching of the power elements using detection currents from the current detectors, wherein the arithmetic and control unit comprises a storage unit for storing current detection characteristic compensation data for compensating for fluctuations in the characteristics of the current detectors, current value computing means for computing current values by correcting detection currents from the current detectors based on the current detection characteristic compensation data, and means for computing and generating drive signals for controlling the switching of the power elements based on the computed current values.

2. A motor controller for controlling an application current to a motor, which comprises current detectors arranged on power lines for connecting power elements in a power converter to the motor and an arithmetic and control unit for controlling the switching of the power elements using detection currents from the current detectors, wherein the controller further comprises an ambient temperature detector for detecting the ambient temperature of the arithmetic and control unit and current value computing means for computing current values by correcting detection currents from the current detectors so that the arithmetic and control unit compensates for changes in constants of electronic circuit part in the arithmetic and control unit caused by temperature variations based on the detected ambient temperature.

3. The motor controller of claim 1, wherein an ambient temperature detector for detecting the ambient temperature of the arithmetic and control unit is provided, and current value computing means for computing current values by correcting detection currents from the current detectors based on current detection characteristic compensation data carries out a compensation operation for compensating for changes in constants of electronic circuit parts in the arithmetic and control unit caused by temperature variations based on the detected ambient temperature to compute the current values.

4. The motor controller of claim 1, wherein the current detectors are built in the power converter, and the power converter and the arithmetic and control unit are stored in the same container.

5. The motor controller of claim 1, wherein the power converter and the arithmetic and control unit are stored in the same container, current detectors having resistance characteristics are used and stored in the power converter, temperature detectors are provided near the current detectors, a storage unit prestores current detection characteristic compensation data for compensating for fluctuations in the characteristics of the current detectors caused by the temperature variations, and current value computing means computes current values by correcting detection currents from the current detectors based on detection temperatures from the temperature detectors and the current detection characteristic compensation data.

6. The motor controller of claim 5, wherein the current detectors are arranged near the power elements, and the temperature detectors also serve as power element temperature detectors for preventing the overheating of the power elements.

7. The motor controller of claim 5, wherein the characteristics of the temperature detectors are prestored as data connected with the detection temperature of an ambient temperature detector for detecting the ambient temperature of the arithmetic and control unit, and the arithmetic and control unit comprises temperature computing means for computing temperature from the detection values of the temperature detectors based on data on the characteristics of the temperature detectors.

8. The motor controller of claim 1, wherein the arithmetic and control unit comprises means for creating current detection characteristic compensation data before the control operation of the motor, and the characteristics of the current detectors are measured to create the above current detection characteristic compensation data for compensating for fluctuations in the characteristics and to store them in the storage unit.

9. The motor controller of claim 8, wherein the characteristics of the current detectors are measured to create the current detection characteristic compensation data, accompanied by the switching operation of the power elements.

10. The motor controller of claim 5, wherein the arithmetic control unit comprises means for creating the current detection characteristic compensation data before the control operation of the motor, and the characteristics of the current detectors are measured by controlling the switching operation of the power elements based on detection temperatures from the current detectors to create the above current detection characteristic compensation data for compensating for fluctuations in the characteristics of the current detectors caused by temperature variations and to store them in the storage unit.

11. The motor controller of claim 9, wherein the switching operation of the power elements at the time of creating the current detection characteristic compensation data is carried out so that a direct current runs through the current detectors.

12. The motor controller of claim 1, wherein the current detection characteristic compensation data are stored separately for each of the current detectors and the computation of current values by the current value computing means is carried out for each of the current detectors.

13. The motor controller of claim 1, wherein the current detection characteristic compensation data are provided in the form of temperature compensation maps or temperature compensation expressions.

14. The motor controller of claim 13, wherein detection value data from the current detectors are collected together with temperature values detected by the temperature detectors such that the intervals between the temperature data values become a predetermined value with respect to an instruction current value running through the current detectors, and compensation maps are constructed with instruction current values, temperature data and detection value data collected by changing the instruction current value at predetermined intervals.

* * * * *